(12) United States Patent
Carroll et al.

(10) Patent No.: US 11,103,002 B2
(45) Date of Patent: *Aug. 31, 2021

(54) PRODUCT PORTION ENROBING MACHINES AND METHODS

(71) Applicant: Altria Client Services LLC, Richmond, VA (US)

(72) Inventors: Andrew Nathan Carroll, Chester, VA (US); Shannon Maxwell Black, Richmond, VA (US); Yan Helen Sun, Midlothian, VA (US); William J. Burke, Nashville, TN (US); Robert Smith, Glen Allen, VA (US)

(73) Assignee: Altria Client Services LLC, Richmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/804,590

(22) Filed: Feb. 28, 2020

(65) Prior Publication Data
US 2020/0196655 A1  Jun. 25, 2020

Related U.S. Application Data

(60) Continuation of application No. 16/426,476, filed on May 30, 2019, now Pat. No. 10,588,339, which is a
(Continued)

(51) Int. Cl.
*A24B 15/18* (2006.01)
*D04H 13/00* (2006.01)
(Continued)

(52) U.S. Cl.
CPC ............. *A24B 15/186* (2013.01); *A24B 3/14* (2013.01); *A24B 13/00* (2013.01); *A24B 15/14* (2013.01);
(Continued)

(58) Field of Classification Search
CPC ......... A24B 3/14; A24B 15/186; A24F 23/02; D04H 13/001
See application file for complete search history.

(56) References Cited

U.S. PATENT DOCUMENTS

| 1,684,421 A | 9/1928 | Thompson |
| 2,580,609 A | 1/1952 | Schur et al. |

(Continued)

FOREIGN PATENT DOCUMENTS

| DE | 10346649 A1 | 5/2005 |
| EP | 2449894 A1 | 5/2012 |

(Continued)

OTHER PUBLICATIONS

Canadian Office Action for corresponding Application No. CA 2,905,059 dated Sep. 22, 2020 (4 pages).
(Continued)

*Primary Examiner* — Anthony Calandra
(74) *Attorney, Agent, or Firm* — Harness, Dickey & Pierce, P.L.C.

(57) ABSTRACT

An apparatus for enrobing a product portion can include at least one polymer spray head adapted to create at least one flow of polymeric fibers to produce at least one polymer enrobing zone and a conveyor system adapted to move at least one product portion from at least one position below at least one polymer enrobing zone and to at least one position above at least one polymer enrobing zone to drop each product portion through one or more polymer enrobing zones a plurality times at different orientations to enrobe each product portion with polymeric fibers.

22 Claims, 8 Drawing Sheets

Related U.S. Application Data continuation of application No. 15/594,190, filed on May 12, 2017, now Pat. No. 10,306,916, which is a division of application No. 14/213,108, filed on Mar. 14, 2014, now Pat. No. 9,693,582.

(60) Provisional application No. 61/786,295, filed on Mar. 14, 2013.

(51) Int. Cl.

| | | |
|---|---|---|
| *A24B 3/14* | (2006.01) | |
| *A24F 23/02* | (2006.01) | |
| *A24B 13/00* | (2006.01) | |
| *D01D 11/06* | (2006.01) | |
| *D01D 5/18* | (2006.01) | |
| *D01D 5/098* | (2006.01) | |
| *D01D 5/00* | (2006.01) | |
| *B65G 15/44* | (2006.01) | |
| *B65G 51/02* | (2006.01) | |
| *B65G 15/24* | (2006.01) | |
| *A24B 15/28* | (2006.01) | |
| *A24B 15/14* | (2006.01) | |
| *A24B 15/40* | (2006.01) | |
| *B05B 13/02* | (2006.01) | |

(52) U.S. Cl.
CPC ............ *A24B 15/28* (2013.01); *A24B 15/283* (2013.01); *A24B 15/403* (2013.01); *A24F 23/02* (2013.01); *B05B 13/0221* (2013.01); *B65G 15/24* (2013.01); *B65G 15/44* (2013.01); *B65G 51/02* (2013.01); *D01D 5/0084* (2013.01); *D01D 5/0985* (2013.01); *D01D 5/18* (2013.01); *D01D 11/06* (2013.01); *D04H 13/00* (2013.01); *D04H 13/001* (2013.01)

(56) References Cited

U.S. PATENT DOCUMENTS

| | | |
|---|---|---|
| 2,734,509 A | 2/1956 | Jurgensen, Jr. |
| 4,084,627 A | 4/1978 | Focke et al. |
| 4,090,521 A | 5/1978 | Elsner |
| 4,360,328 A | 11/1982 | Kassabian |
| 4,380,570 A | 4/1983 | Schwarz |
| 4,516,590 A | 5/1985 | Teng |
| 4,526,733 A | 7/1985 | Lau |
| 4,528,993 A | 7/1985 | Sensabaugh, Jr. et al. |
| 4,660,577 A | 4/1987 | Sensabaugh et al. |
| 4,725,446 A | 2/1988 | Forster |
| 4,848,373 A | 7/1989 | Lenkey |
| 4,987,907 A | 1/1991 | Townend |
| 5,059,435 A | 10/1991 | Sloan et al. |
| 5,063,104 A | 11/1991 | Robertson et al. |
| 5,146,955 A | 9/1992 | Steiner et al. |
| 5,372,149 A | 12/1994 | Roth et al. |
| 5,476,616 A | 12/1995 | Schwarz |
| 5,528,993 A | 6/1996 | Vincelli |
| 5,645,790 A | 7/1997 | Schwarz et al. |
| 5,876,775 A | 3/1999 | Behnke et al. |
| 6,013,223 A | 1/2000 | Schwarz |
| 6,207,601 B1 | 3/2001 | Maurer et al. |
| 6,455,030 B2 | 9/2002 | Saito et al. |
| 6,709,623 B2 | 3/2004 | Haynes et al. |
| 6,716,498 B2 | 4/2004 | Curro et al. |
| 6,849,330 B1 | 2/2005 | Morin et al. |
| 7,156,937 B2 | 1/2007 | Provost et al. |
| 7,465,366 B2 | 12/2008 | Provost et al. |
| 7,547,469 B2 | 6/2009 | Provost et al. |
| 7,562,426 B2 | 7/2009 | Barker et al. |
| 7,666,261 B2 | 2/2010 | Bailey et al. |
| 7,718,556 B2 | 5/2010 | Matsuda et al. |
| 7,810,507 B2 | 10/2010 | Dube et al. |
| 9,763,473 B2 | 9/2017 | Carroll et al. |
| 10,039,309 B2 | 8/2018 | Carroll et al. |
| 10,258,076 B2 | 4/2019 | Carroll et al. |
| 10,463,070 B2 | 11/2019 | Carroll et al. |
| 2004/0038022 A1 | 2/2004 | Maugans et al. |
| 2004/0038790 A1 | 2/2004 | Pehmoller et al. |
| 2004/0118421 A1 | 6/2004 | Hodin et al. |
| 2004/0118422 A1 | 6/2004 | Lundin et al. |
| 2004/0209540 A1 | 10/2004 | Schwarz |
| 2005/0056956 A1 | 3/2005 | Zhao et al. |
| 2005/0178398 A1 | 8/2005 | Breslin et al. |
| 2005/0196580 A1 | 9/2005 | Provost et al. |
| 2005/0196583 A1 | 9/2005 | Provost et al. |
| 2005/0217092 A1 | 10/2005 | Barker et al. |
| 2005/0244521 A1 | 11/2005 | Strickland |
| 2006/0191458 A1 | 8/2006 | George |
| 2006/0191548 A1 | 8/2006 | Strickland et al. |
| 2006/0264130 A1 | 11/2006 | Karles et al. |
| 2006/0292271 A1 | 12/2006 | King |
| 2007/0261707 A1 | 11/2007 | Winterson et al. |
| 2008/0209586 A1 | 8/2008 | Nielsen et al. |
| 2008/0302682 A1 | 12/2008 | Engstrom et al. |
| 2008/0305297 A1 | 12/2008 | Barker et al. |
| 2008/0308115 A1 | 12/2008 | Zimmermann |
| 2009/0133703 A1 | 5/2009 | Strickland et al. |
| 2009/0203280 A9 | 8/2009 | Provost et al. |
| 2009/0256277 A1 | 10/2009 | Brown et al. |
| 2009/0258099 A1 | 10/2009 | Brown et al. |
| 2009/0258562 A1 | 10/2009 | Brown et al. |
| 2010/0018539 A1 | 1/2010 | Brinkley et al. |
| 2010/0018882 A1 | 1/2010 | St. Charles |
| 2010/0170522 A1 | 7/2010 | Sun et al. |
| 2010/0242978 A1 | 9/2010 | Fuisz |
| 2010/0300465 A1 | 12/2010 | Zimmermann |
| 2011/0036364 A1 | 2/2011 | Pienemann et al. |
| 2011/0083688 A1 | 4/2011 | Mishra et al. |
| 2011/0220130 A1 | 9/2011 | Mua et al. |
| 2012/0024301 A1 | 2/2012 | Carroll et al. |
| 2012/0031414 A1 | 2/2012 | Atchley et al. |
| 2012/0031416 A1 | 2/2012 | Atchley et al. |
| 2012/0103353 A1 | 5/2012 | Sebastian et al. |
| 2013/0031414 A1 | 1/2013 | Dhuse et al. |
| 2018/0325162 A1 | 11/2018 | Carroll et al. |

FOREIGN PATENT DOCUMENTS

| | | |
|---|---|---|
| GB | 2373988 A | 10/2002 |
| WO | WO-05/046363 A2 | 5/2005 |
| WO | WO-2005/115180 A1 | 12/2005 |
| WO | WO-20081015573 A2 | 2/2008 |
| WO | WO-2009/010878 A2 | 1/2009 |
| WO | WO-2009/048522 A1 | 4/2009 |
| WO | WO-2009/063010 A2 | 5/2009 |

OTHER PUBLICATIONS

Canadian Office Action for corresponding Application No. CA 2,905,069 dated Sep. 23, 2020 (4 pages).
Canadian Office Action for corresponding Application No. CA 2,905,069 dated Feb. 24, 2020 (8 pages).
Canadian Office Action for corresponding Application No. CA 2,905,059 dated Feb. 24, 2020 (5 pages).
Canadian Office Action for corresponding Application No. CA 2,905,063 dated Sep. 30, 2020 (4 pages).
Notice of Allowance for U.S. Appl. No. 16/380,095 dated Jul. 23, 2020 (8 pages).
European Office Action for corresponding Application No. EP 14717364.5 dated Oct. 12, 2020 (3 pages).
Canadian Office Action for corresponding Application No. CA 2,905,063 dated Feb. 24, 2020 (5 pages).
European Office Action for corresponding Application No. 14716186.3-1105, dated Apr. 15, 2020.
Office Action for corresponding U.S. Appl. No. 15/688,114 dated Jul. 10, 2018.
Tso, Chapter 1 in Tobacco, Production, Chemistry and Technology, 1999, Davis & Nielsen, eds. Blackwell Publishing, Oxford.

(56) References Cited

OTHER PUBLICATIONS

Rydholm, Pulping Processes, Interscience Publishers, 1967, pp. 51-52.
International Search Report and Written Opinion in International Application No. PCT/US2014/028354, dated Jul. 10, 2014, 12 pages.
International Preliminary Report on Patentability in International Application No. PCT/US2014/028354, dated Sep. 24, 2015, 10 pages.
Making Cosmetics, Polysaccharides (Sugars, Gums) used in Cosmetics, downloaded online Oct. 29, 2015.
International Search Report and Written Opinion in International Application No. PCT/US2014/028325, dated Sep. 8, 2014, 12 pages.
International Preliminary Report on Patentability in International Application No. PCT/US2014/028325, dated Sep. 24, 2015, 10 pages.
International Search Report and Written Opinion in International Application No. PCT/US2014/028389, dated Aug. 4, 2014, 9 pages.
International Preliminary Report on Patentability in International Application PCT/US2014/028389, dated Sep. 24, 2015, 7 pages.
Nishida, Automatic Cotton Candy Machine (https://www.youtube.com/watch?v=T6MIAn4m8K0), Aug. 2006.
United States Office Action for corresponding U.S. Appl. No. 15/261,515 dated Feb. 11, 2019.
European Office Action for corresponding Application No. 14717364.5-1105, dated Jun. 11, 2019.
United States Office Action for corresponding U.S. Appl. No. 16/426,476 dated Jul. 30, 2019.
Notice of Allowance for corresponding U.S. Appl. No. 15/261,515 dated Aug. 21, 2019.
Notice of Allowance for corresponding U.S. Appl. No. 16/426,476 dated Nov. 15, 2019, 9 pages.
Office Action for corresponding U.S. Appl. No. 16/380,095 dated Apr. 3, 2020 (6 pages).
United States Notice of Allowance for U.S. Appl. No. 16/380,095 dated Dec. 2, 2020.

PRODUCT PORTION ENROBING MACHINES AND METHODS

CROSS REFERENCE TO RELATED APPLICATIONS

This application is a continuation of U.S. application Ser. No. 16/426,476, filed May 30, 2019, which is a continuation of U.S. application Ser. No. 15/594,190, filed May 12, 2017, which is a divisional of application Ser. No. 14/213,108, filed on Mar. 14, 2014, which claims the benefit of priority under 35 U.S.C. § 119(e) to U.S. Application No. 61/786,295 filed Mar. 14, 2013, the entire contents of each of which are incorporated herein by reference.

FIELD

This disclosure generally relates to processes and machines for enrobing product portions with polymeric fibers. In some cases, portions of smokeless tobacco can be enrobed in polymeric fibers to create a fiber-wrapped smokeless tobacco-product.

BACKGROUND

Smokeless tobacco is tobacco that is placed in the mouth and not combusted. There are various types of smokeless tobacco including: chewing tobacco, moist smokeless tobacco, snus, and dry snuff. Chewing tobacco is coarsely divided tobacco leaf that is typically packaged in a large pouch-like package and used in a plug or twist. Moist smokeless tobacco is a moist, more finely divided tobacco that is provided in loose form or in pouch form and is typically packaged in round cans and used as a pinch or in a pouch placed between an adult tobacco consumer's cheek and gum. Snus is a heat treated smokeless tobacco. Dry snuff is finely ground tobacco that is placed in the mouth or used nasally.

Smokeless tobacco can be pouched in a permeable fabric using a pouching machine where a supply of pouching material is sealed around a deposit of smokeless tobacco material. Such a pouch holds the tobacco in place, while at the same time letting the flavors and substances of the tobacco pass through the walls of the pouch and into the adult tobacco consumer's mouth. A conventional pouching machine may form a supply of pouching material around the tube, seal the edges of the pouching material to form a tube of pouching material, form a cross-seal to form a bottom of the pouch, deliver an amount of smokeless tobacco through the tube and into the bottom-sealed pouch, move the bottom-sealed pouch off the tube, and form a second cross-seal above the smokeless tobacco to close the pouch. The second cross-seal can also be used as the bottom seal for a subsequent pouch as the process continues. Individual pouches can be cut at the cross-seals. FIG. 6B depicts an example of a pouched smokeless tobacco product made using a traditional pouching machine.

SUMMARY

Methods and machines provided herein can be used to enrobe a product portion (e.g., a smokeless tobacco-product portion) with polymeric fibers. Polymeric fiber enrobed product portions can be used in a number of consumer products, such as smokeless tobacco products and herbal products (e.g., tea). As compared to a conventional pouch made using a conventional pouching machine, a fiber-wrapped smokeless tobacco portion made using the methods and machines provided herein can have an improved mouth feel (e.g., no discernible seams), be more permeable, and/or be more chewable. Methods and machines provided herein can be used to efficiently and reliably enrobe multiple product portions. In some cases, elastomeric enrobed product portions produced by methods and machines provided herein can provide the unique property of allowing an adult tobacco consumer to reduce or increase a packing density of an elastomeric enrobed product portion during use, which can impact a rate of flavor release. A higher packing density can reduce a rate of flavor release. In some cases, enrobing material used in methods and machines provided herein can be hydrophilic, which can provide a moist appearance and/or provide superior flavor release for enrobed consumable product portions. In some cases, methods and machines provided herein can produce an enrobed smokeless tobacco/tobacco substitute product having a low basis weight web of polymeric fibers, which can be more permeable to flavor release.

Machines for enrobing a product portion provided herein can include at least one polymer spray head adapted to create a polymer enrobing zone and a conveyor system adapted to repeatedly move a product portion from below a polymer enrobing zone and to above a polymer enrobing zone for multiple passes (e.g., drops) through one or more polymer enrobing zones. A polymer spray head can create a polymer enrobing zone by producing a plurality of polymeric fibers. In some cases, the polymer spray head can be a melt blowing device, an electro spinning device, and/or a force spinning device. In some cases, the conveyor system is adapted to pass (e.g., drop) each product portion through one or more polymer enrobing zones a predetermined number of times.

In some cases, the conveyor system is adapted to move at least one product portion from at least one position below a first polymer enrobing zone to at least one position above the first polymer enrobing zone to pass (e.g., drop) each product portion through the first polymer enrobing zone a plurality times. In some cases, the conveyor system is adapted to move each product portion laterally with each pass (e.g., drop). For example, baffles above or below said first polymer enrobing zone can direct each product portion to slide laterally between each pass (e.g., drop). In some cases, the conveyor system includes a conveyor belt adapted to move between a position below said first polymer enrobing zone and a position above said first polymer enrobing zone. A conveyor belt provided herein can include a plurality of ridges adapted to inhibit product portions from sliding or rolling backwards on said conveyor belt. In some cases, the conveyor system includes one or more pneumatic conveying tubes.

In some cases, the conveyor system includes a rotary drum positioned around the at least one polymer spray head. A rotary drum provided herein can move at least one product portion from at least one position below at least one polymer enrobing zone and to at least one position above at least one polymer enrobing zone to pass (e.g., drop) each product portion through one or more polymer enrobing zones a plurality times. In some cases, a rotary drum conveyor system can include a spray guard positioned between said rotary drum and said polymer spray head. In some cases, a collection conveyor positioned within the rotary drum can collect polymer fibers from said polymer spray head to ensure that polymer fibers do not deposit on a surface of the rotary drum. In some cases, a rotary drum conveyor system provided herein can include a portion guide in said rotary drum adapted to ensure that product portions travel around the perimeter of said rotary drum and back into the at least one polymer enrobing zone. In some cases, the rotary drum can be tilted to ensure that products exit the drum at a predetermined end.

In some cases, machines provided herein include multiple polymer spray heads each creating a separate polymer enrobing zone. A conveyor system provided herein can convey one or more product portions passed through a first polymer enrobing zone from a position below the first polymer enrobing zone to a position above a second polymer enrobing zone to pass (e.g., drop) each product portion through the second polymer enrobing zone. In some cases, machines provided herein include 2 or more polymer enrobing zones, 3 or more polymer enrobing zones, 4 or more polymer enrobing zones, 5 or more polymer enrobing zones, or 6 or more polymer enrobing zones. Conveyor systems provided herein can direct product portions through any number of polymer enrobing zones.

Machines provided herein can include a molding device to mold one or more product portions. A molding device can be positioned to deposit product portions on a conveyor adapted to deliver one or more product portions to a position adjacent a polymer enrobing zone.

Methods of enrobing a product portion in polymer strands provided herein can include directing a plurality of polymeric fibers from a polymer spray head to create at least a first polymer enrobing zone, passing at least one product portion through the first polymer enrobing zone, and conveying the at least one product portion from a position below the first polymer enrobing zone to a position above the first polymer enrobing zone or a second polymer enrobing zone for a second pass (e.g., a second drop) through a polymer enrobing zone. In some cases, a conveyor belt, a rotary drum, and/or a pneumatic tube are used to move the at elast one product portion. In some cases, product portion can be moved such that they have different orientations for different passes (e.g., drops) through polymer enrobing zones relative to the polymer spray head making each polymer enrobing zone. In some cases, each of the features discussed herein regarding the machines provided herein are used in methods provided herein.

Methods and machines provided herein can, in some cases, direct molten polymer towards one or more product portions in the polymer enrobing zone such that the molten polymer naturally wraps around the three dimensional product portion. Molten polymer from one or more polymer spray heads can in the polymer enrobing zone can quickly solidify once cooled to create a random orientation of meshed polymeric fibers that completely wrap the product portion. In some cases, polymeric fibers provided herein (e.g., polyurethane, polypropylene, etc.) can stick to themselves after solidifying, which can avoid a need to seal a resulting enrobed product portion. For example, smokeless tobacco product portions provided herein can be enrobed in polyurethane and/or polypropylene to form a seamless outer layer, thus avoiding the seams commonly found in conventionally pouched smokeless tobacco products.

Product portions enrobed in methods and machines provided herein can be any suitable product. Product portions enrobed herein can be products with sufficient integrity to not fall apart when passed through the one or more polymer enrobing zones. In some cases, product portions enrobed in methods provided herein include consumable products (e.g., tobacco, herbal products such as teas, mint, etc.). In some cases, product portions enrobed in methods provided herein have an overall oven volatiles content of about 4% by weight to about 61% by weight. In some cases, a binder can be included in the product portion to have the product portion retain its integrity during the enrobing process provided herein. In some cases, a product portion can include between 0.1 and 0.5 weight percent of a binder. Suitable binders include guar gum, xanthan gum, cellulose gum, and combinations thereof. In some cases, pre-hydrated Arabic gum can be used in product portions (e.g., smokeless tobacco products) to act as an emulsifier to increase/improve flavor immediacy.

In some cases, a fiber-wrapped product portion produced using methods and machines provided herein can include a plurality of polymeric fibers surrounding the product portion. The polymeric fibers overlying the product portion can have a basis weight of 40 grams per square meter (gsm) or less, 30 gsm or less, 20 gsm or less, 10 gsm or less, or 5 gsm or less. The polymeric fibers can have diameters of less than 100 microns. In some cases, the polymeric fibers are meltblown polymeric fibers. In some cases, the polymeric fibers are force-spun polymeric fibers. In some cases, an electrostatic charge can be applied to the plurality of polymeric fibers, one or more product portions, or a combination thereof. In some cases, a spin is applied to the product portions when passed through the polymer enrobing zone. In some cases, the polymer fibers wrap and seal the body of the product portions simultaneously. In some cases, combinations of mouth-stable and mouth-dissolvable polymeric materials are combined to form a fiber-wrapped product portion that becomes looser when consumed, yet remains generally cohesive. The polymeric fibers can also be a composite of multiple materials, which may include both mouth-stable and mouth-dissolvable materials.

In some cases, fiber-wrapped smokeless tobacco products produced using methods and machines provided herein provide a unique tactile and flavor experience to an adult tobacco consumer. In particular, the polymeric fibers can provide a smoother mouth texture and improved access to the smokeless tobacco, improved porosity, and improved fluid exchange, as compared to a traditional pouching material, but still retain the smokeless tobacco. Moreover, the methods provided herein can result in a seamless wrapping of polymeric fibers, which can reduce mouth irritation. Methods and machines provided herein can also eliminate a need to separate and seal individual pouches. Furthermore, the polymeric fibers provided herein can be more elastic and can permit an adult tobacco consumer to chew/squeeze the fiber-wrapped smokeless tobacco product and mold the product into a desired shape (e.g., to comfortably conform the product between the cheek and gum). As compared to a typical pouch paper, the fiber wrappings produced using methods and machines provided herein can be softer, have a lower basis weight, and act as less of a selective membrane.

The products and methods described herein can also be applied to other orally consumable plant materials, in addition to smokeless tobacco. For example, some non-tobacco or "herbal" compositions have also been developed as an alternative to smokeless tobacco compositions. Non-tobacco products may include a number of different primary ingredients, including but not limited to, tea leaves, red clover, coconut flakes, mint leaves, citrus fiber, bamboo fiber, ginseng, apple, corn silk, grape leaf, and basil leaf. In some cases, such a non-tobacco smokeless product can further include tobacco extracts, which can result in a non-tobacco smokeless product providing a desirable mouth feel and flavor profile. In some cases, the tobacco extracts can be extracted from a cured and/or fermented tobacco by mixing the cured and/or fermented tobacco with water and/or other solvents and removing the non-soluble tobacco material. In some cases, the tobacco extracts can include nicotine. In some cases, a pouched non-tobacco product has an overall oven volatiles content of between 10 weight percent and 61 weight percent.

Unless otherwise defined, all technical and scientific terms used herein have the same meaning as commonly understood by one of ordinary skill in the art to which the methods and compositions of matter belong. Although methods and materials similar or equivalent to those described herein can be used in the practice or testing of the methods and compositions of matter, suitable methods and materials are described below. In addition, the materials, methods, and examples are illustrative only and not intended to be limiting. All publications, patent applications, patents, and other references mentioned herein are incorporated by reference in their entirety.

DESCRIPTION OF DRAWINGS

Like reference symbols in the various drawings indicate like elements.

DETAILED DESCRIPTION

Figure 1A:
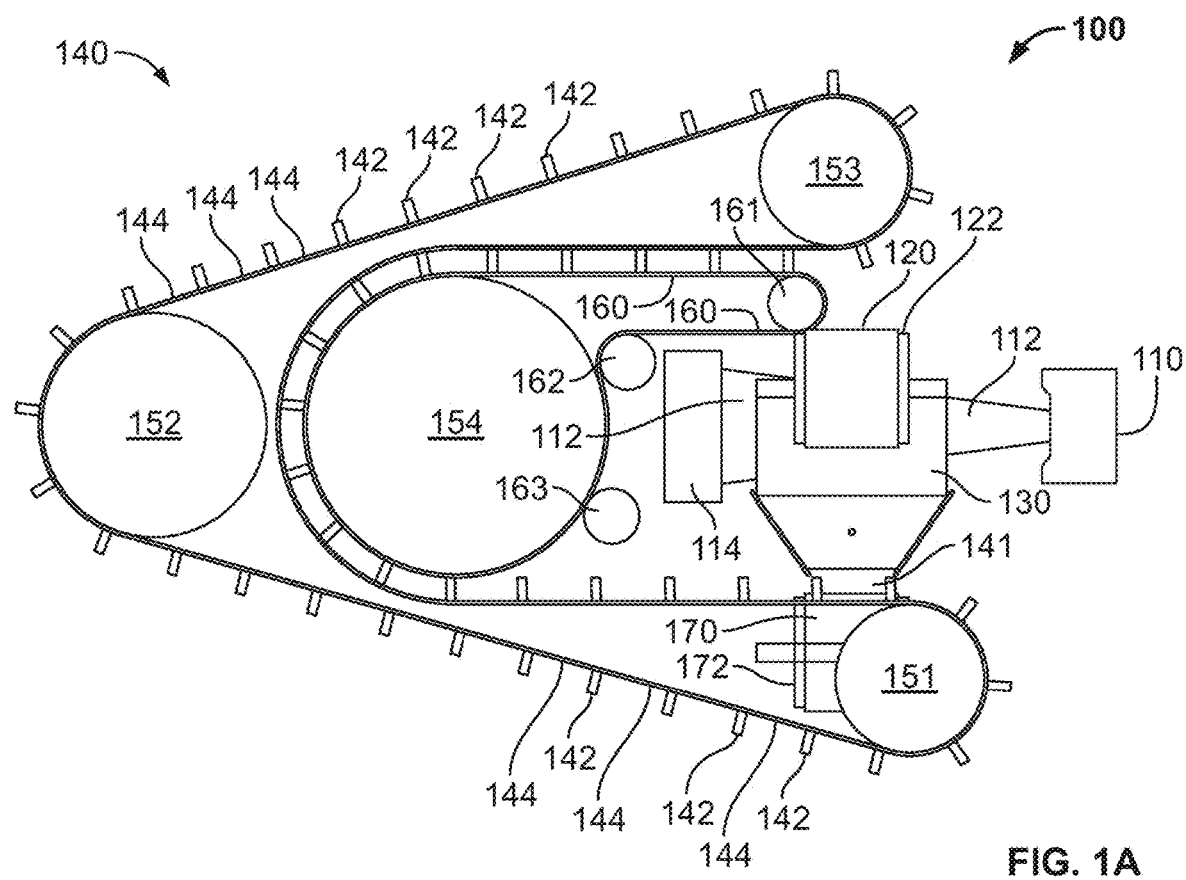
FIGS. 1A and 1B depict an exemplary apparatus of a product portion enrobing apparatus provided herein having an elevator design using a single polymer enrobing zone.

Methods and machines provided herein can be used to enrobe one or more product portions (e.g., smokeless tobacco product portions) with polymeric fibers. Methods and machines provided herein can be used to efficiently and reliably enrobe multiple product portions while providing gentle handling of the product portions. For example, smokeless tobacco portions enrobed by process and machines provided herein can have a high friability prior to enrobing. Methods and machines provided herein can distribute polymeric fibers onto a product portion evenly across all surfaces of a product portion while minimizing the strain on the product portions. In some cases, methods and machines provided herein can achieve a uniform application of polymeric fibers on all sides of multiple product portions in an automated process.

Methods and machines provided herein pass (e.g. drop) product portions through one or more polymer enrobing zone multiple times at two or more orientations relative to one or more polymer spray heads to thus receive substantially complete coverage of all surfaces. In some cases, product portions can spin or tumble in said polymer enrobing zone. Methods and machines provided herein can use a variety of techniques to convey product portions from a position below a polymer enrobing zone and to a position above a polymer enrobing zone. Methods and machines provided herein can be automated to efficiently and reliably enrobe one or more product portions with polymeric fibers using a predetermined number of passes (e.g., drops) through one or more polymer enrobing zones. In some cases, machines and methods provided herein include a plurality of polymer spray heads, each producing a polymer enrobing zone and each product portion is passed once through each polymer enrobing zone. In some cases, machines and methods provided herein include a single polymer enrobing zone and a conveyor system to repeatedly pass (e.g., drop) one or more product portions through the single polymer enrobing zone. In some cases, machines provided herein can allow for a predetermined number of passes through a single polymer enrobing zone for a plurality of product portions by changing a lateral position of a drop position with each successive drop. For example, a lateral position in a single polymer enrobing zone can be shifted after each pass by positioning baffles below the single polymer enrobing zone.

Methods and machines provided herein can use any suitable conveying system to move one or more product portions from collection points below one or more polymer enrobing zones and drop positions above one or more polymer enrobing zones. In some cases, conveying systems used in methods and machines provided herein can include a conveyor belt. In some cases, a conveyor belt can include terraces or ridges to limit sliding of product portions on the conveyor belt. Conveyor belts can be drive using conveyor rollers. In some cases, conveying systems used in methods and machines provided herein can include pneumatic tubes that can catch one or more product portions exiting a polymer enrobing zone and pneumatically deliver product portions to a drop position above a polymer enrobing zone. In some cases, a plurality of pneumatic tubes can be used with one or multiple polymer enrobing zones provide a predetermined path for a product portion. The predetermined path can have a predetermined number of passes (e.g., drops) through one or more polymer enrobing zones.

Figure 1B:
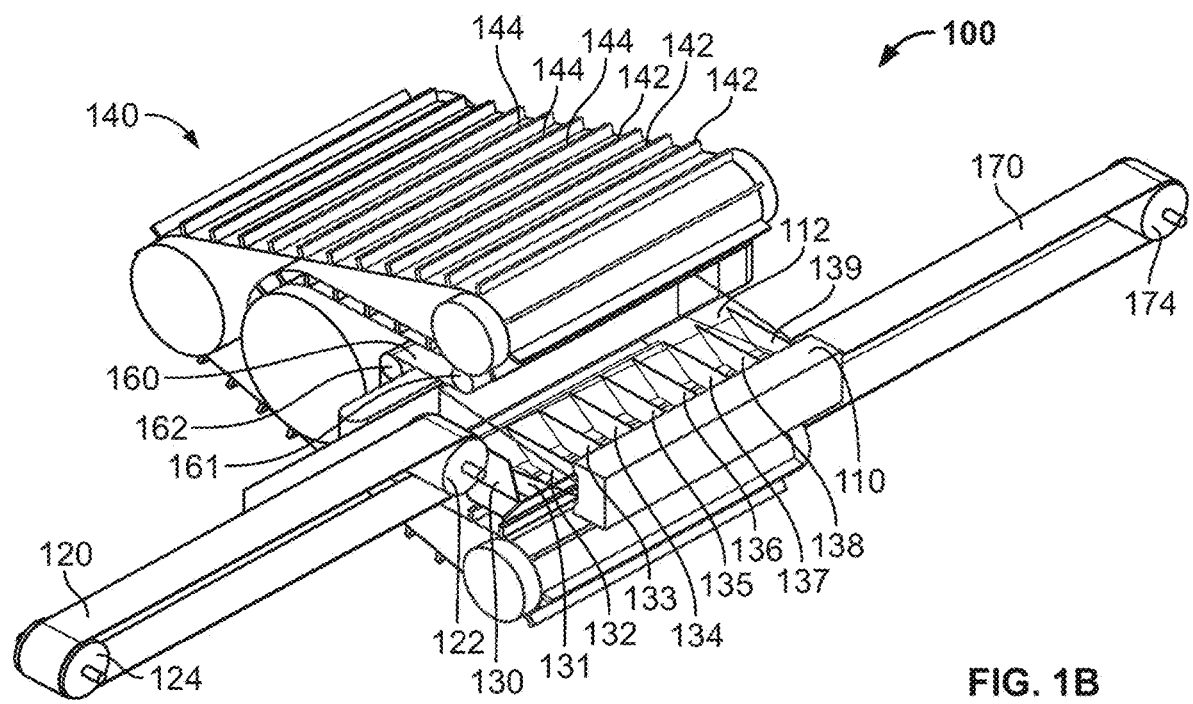

FIGS. 1A and 1B depict an exemplary apparatus of a product portion enrobing apparatus 100 having an elevator design. As shown, the apparatus 100 can include a polymer spray head 110 and polymer collection roller 114 for making a polymer enrobing zone 112 there between. Apparatus 100 further includes an elevator conveying system adapted to move product portions along a predefined path including multiple passes (e.g., drops) through polymer enrobing zone 112. Elevator conveying system includes an introduction conveyor 120 to deliver product portions in sequence for a first pass (e.g., a first drop) through the polymer enrobing zone 112. After the initial pass through polymer enrobing zone 112, a partially enrobed product portion can be collected at collection point 141 and carried on conveyor belts 140 and 160 from the collection point 141 to a second drop position positioned over the polymer enrobing zone 112. As the product portions exits polymer enrobing zone 112, the product portions can slide laterally against inclined baffles 130-139 such that each subsequent drop position and collection point is laterally spaced from the previous drop position and collection point. A final baffle 136 can direct a fully-enrobed product portion from a final pass through polymer enrobing zone towards a collection conveyor 170.

Elevator conveying system can include conveyor belt 140 and a plurality of conveyor rollers 151-154. In some cases, elevator conveying system can flip product portions between each pass. As shown, elevator conveying system can include first conveyor belt 140, including a plurality of ridges 142 which define slots 144 for holding one or more product portions. In some cases, multiple laterally spaced product portions are dropped at the same time through polymer enrobing zone 112 and collected together in the same slot 144. First conveyor belt 140 can interface with a second conveyor belt 160 to flip product portions onto second conveyor belt 160 for a subsequent pass through polymer enrobing zone. Second conveyor belt 160 can be positioned on rollers 161, 162, 163, and 154. Portions of second conveyor belt 160 can sit against ridges 142 as first conveyor belt 140 and second conveyor belt 160 as they move together against roller 154.

Figure 2:
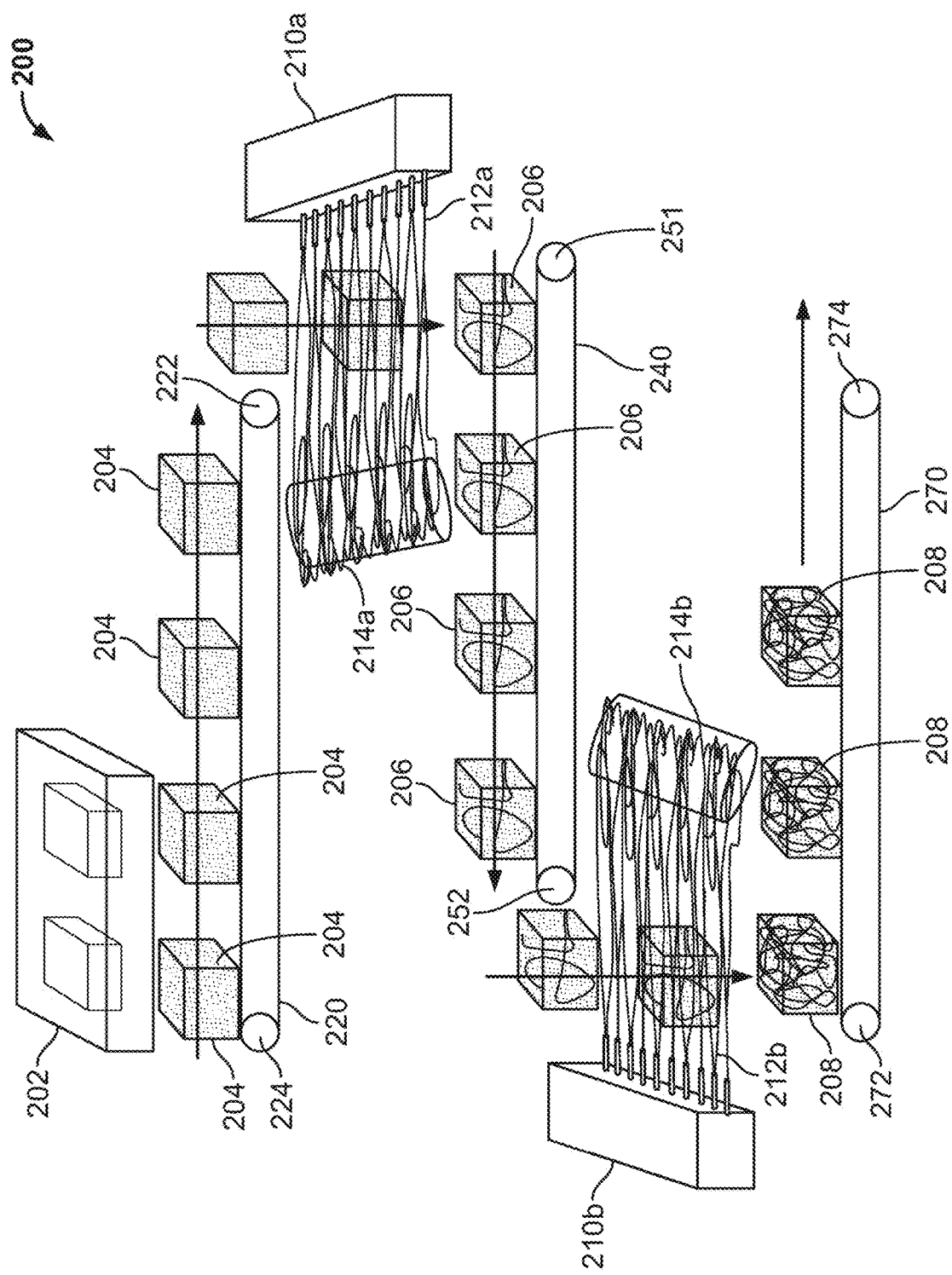
FIG. 2 depicts the method steps of producing an enrobed product portion using a multiple polymer enrobing zones.

FIG. 2 depicts the method steps of producing an enrobed product portion using a multiple polymer enrobing zones. In a first step, product portions 204 are molded in cavities of molding device 202 and deposited onto introduction conveyor 220. Introduction conveyor 220 moves multiple product portions 204 to a first drop position above first polymer enrobing zone 212a formed between a first polymer spray head 210a and a first collection roller 214a. Partially enrobed product portion 206 can land on second conveyor 240 at a first collection point and move partially enrobed product portion 206 to a second drop position above second polymer enrobing zone 212b formed between a second polymer spray head 210b and a second collection roller 214b. Enrobed product portions 208 can land on a collection conveyor 270 at a second collection point. Collection conveyor 270 can deliver enrobed product portions 208 to a packaging station.

Figure 3:
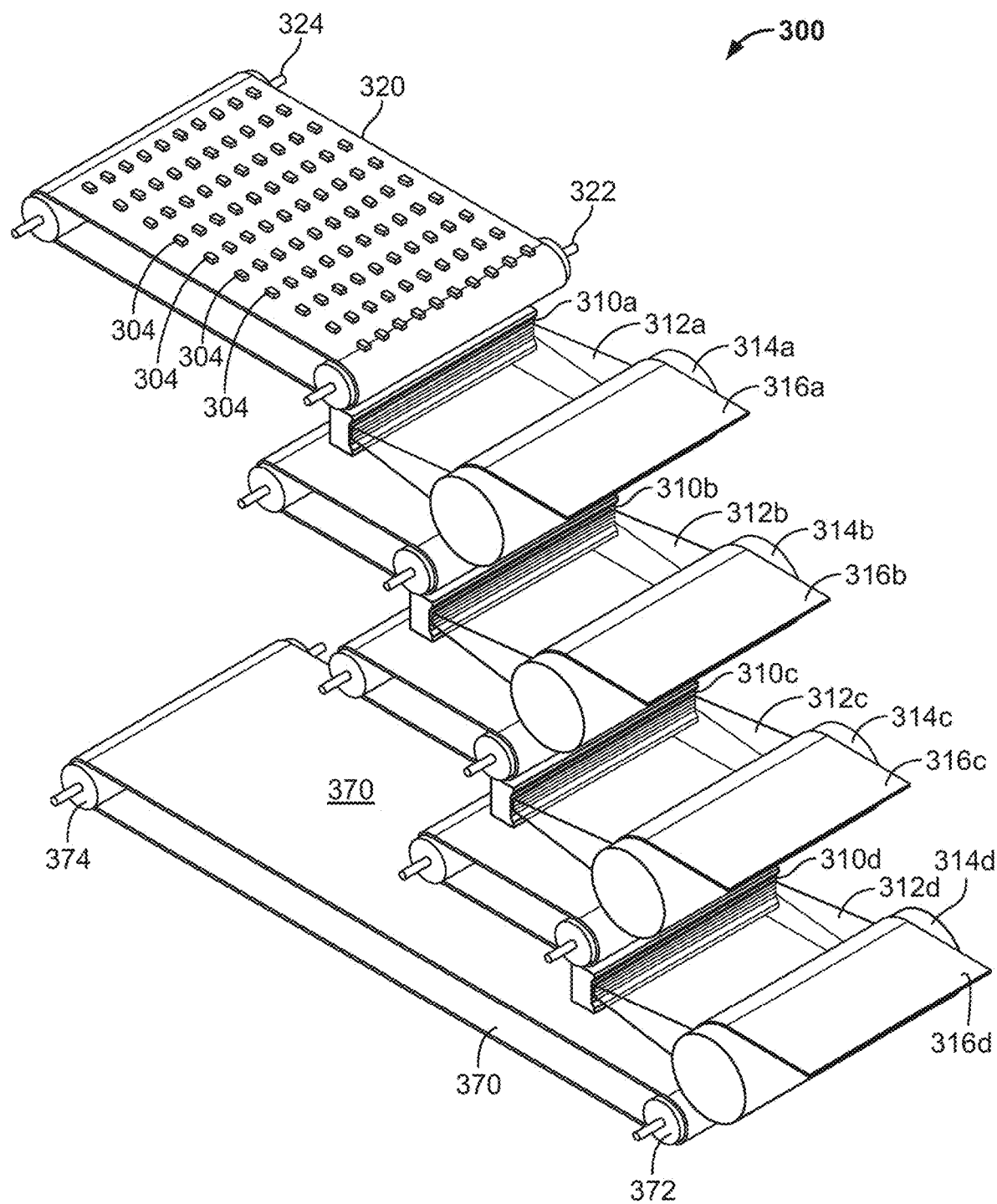
FIG. 3 depicts an exemplary apparatus of a product portion enrobing apparatus provided herein having a waterfall design.

FIG. 3 depicts an example of a product portion enrobing apparatus 300 having a waterfall design. As shown, apparatus 300 forms 4 separate polymer enrobing zones 312a, 312b, 312c, and 312d between polymer spray heads 310a, 310b, 310c, and 310d, and collection rollers 314a, 314b, 314c, and 314d. An introduction conveyor 320, traveling between rollers 322 and 324, can deliver a plurality of spaced product portions 304 into a first polymer enrobing zone 312a. Partially coated product portions can land on first conveyor 340a after falling through first polymer enrobing zone 312a and delivered to a drop position above a second polymer enrobing zone 312b. Partially coated product portions can land on second conveyor 340b after falling through second polymer enrobing zone 312b and delivered to a drop position above a third polymer enrobing zone 312c. Partially coated product portions can land on third conveyor 340c after falling through third polymer enrobing zone 312c and delivered to a drop position above a fourth polymer enrobing zone 312d. Enrobed product portions can land on collection conveyor 370 after falling through fourth polymer enrobing zone 312d. Collection conveyor 370 can travel between rollers 372 and 374. Collection conveyor 370 can deliver enrobed product portions to a packaging station.

Figure 4:
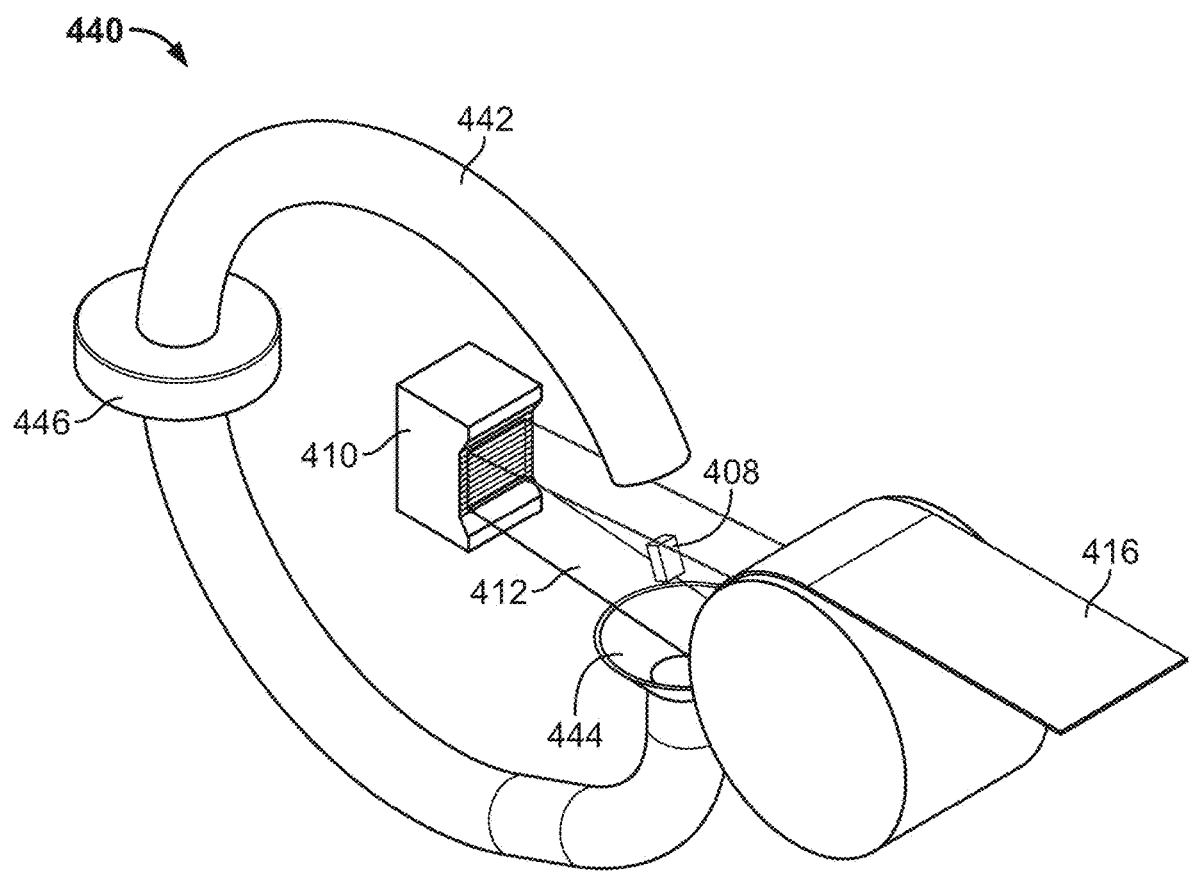
FIG. 4 depicts an exemplary apparatus of a product portion enrobing apparatus provided herein having pneumatic corkscrew design.

FIG. 4 depicts an exemplary product portion enrobing apparatus 400 having corkscrew design. As shown, a single pneumatic tube 440 can be used to collect and deliver a product portion 408 from and to a polymer enrobing zone 412 formed between a polymer spray head 410 and collection roller 414. A sheet 416 of polymeric fibers can be removed from collection roller 414 during the process. Pneumatic tube 440 includes a tubular section 442 and a pneumatic pump 446 adapted to deliver an air flow through said pneumatic tube. Collection port 444 can accept a product portion 408 after they fall through polymer enrobing zone. Although FIG. 4 only depicts one pneumatic tube loop, machines provided herein can include multiple pneumatic tube loops. In some cases, multiple pneumatic tube loops are positioned such that a product portion being dropped from a first pneumatic loop will be collected by a second pneumatic loop. In some cases, a plurality of pneumatic tube loops can be arranged to form a helix such that each subsequent drop through the polymer enrobing zone is laterally spaced from the previous drop. In some cases, polymer spray head 410 is laterally elongated to accommodate multiple parallel and simultaneous drops through polymer enrobing zone 412.

Figure 5:
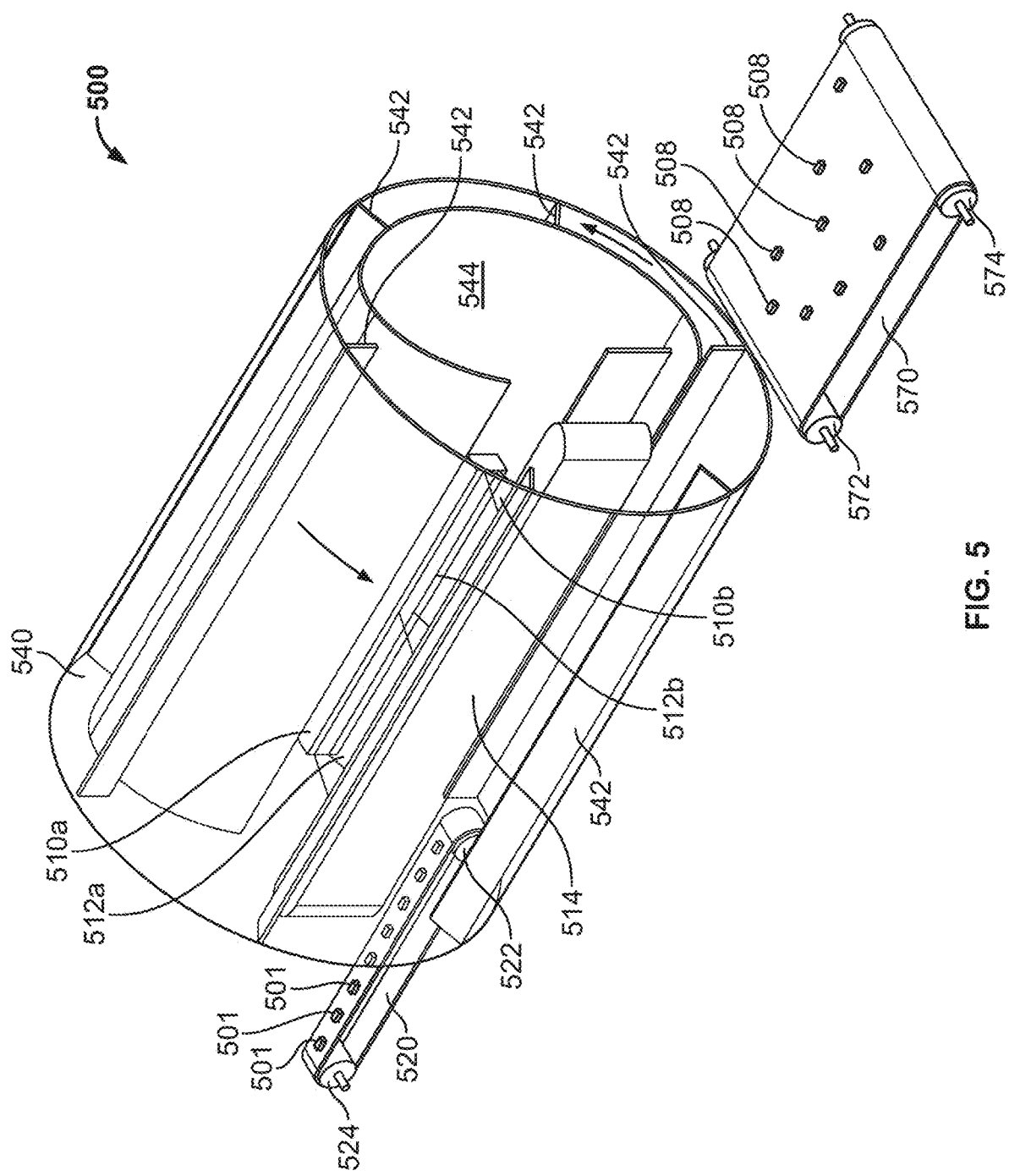
FIG. 5 depicts an exemplary apparatus of a product portion enrobing apparatus provided herein having a rotary drum design

FIG. 5 depicts an exemplary product portion enrobing apparatus 500 having rotary drum design. As shown, rotary drum 540 can be used to move product portions 501 from below one or more polymer enrobing zones 512a and 512b formed between one or more polymer spray heads 510a and 510b and polymer collection conveyor/guard 514. A sheet of polymeric fibers can be removed from collection conveyor/guard 514 during the process. Rotary drum 540 includes terraces 542 that can help deliver product portions to a position above polymer enrobing zones 512a and/or 512b due to a rotation of the rotary drum 540. Terraces 542 can abut portion guide 544 to ensure that product portions move along the desired path. An introduction conveyor 520 can deliver product portions 501 into a bottom portion of rotary drum 540 at a first end of rotary drum 540. Rotary drum 540 rotates to move product portions 501, supported on terraces 542 and/or portion guide 544, to positions above polymer enrobing zones 512a and/or 512b. After multiple drops through polymer enrobing zones 512a and then 512b, an enrobed product portion 508 can be collected at a second end of rotary drum 540 on collection conveyor 570. Rotary drum can be tilted so that product portions 501 move towards collection conveyor 570 with each drop such that each product portion is dropped a number of times within a predetermined range (e.g., between 5 drops and 25 drops). Introduction conveyor 520 can move on rollers 522 and 524. Collection conveyor 572 can move on rollers 572 and 574.

Polymer Spray Head & Polymer Fibers

Polymer spray heads 110, 210a, 210b, 310a-310d, 410, 510a, and 510b, in some cases, produce polymeric fibers by melt-blowing, elecrtro spinning, and/or centrifugal force spinning, which are each described below. The polymer can be any suitable polymer usable in a melt-blowing and/or centrifugal force spinning process, such as polypropylene, polyurethane, cellulose, polyethylene, PVC, viscose, EVA (ethyl vinyl acetate), polyester, and PLA. In some cases, polymeric fibers 210 can be quenched (i.e., rapidly cooled to below their melt temperature) prior to or upon making contact with product portions dropping through polymer enrobing zones 112, 212a, 212b, 312a-312d, 412, 512a, and 512b. For example, water or other liquid can be sprayed into a polymeric fiber stream as it exits the polymer spray head 110, 210a, 210b, 310a-310d, or 410. In some cases, the polymeric fibers can be quenched with a surfactant, flavor, or other solution. In some cases, the polymeric fibers can be cooled to below the melt temperature after contact with product portions.

Figure 6A:
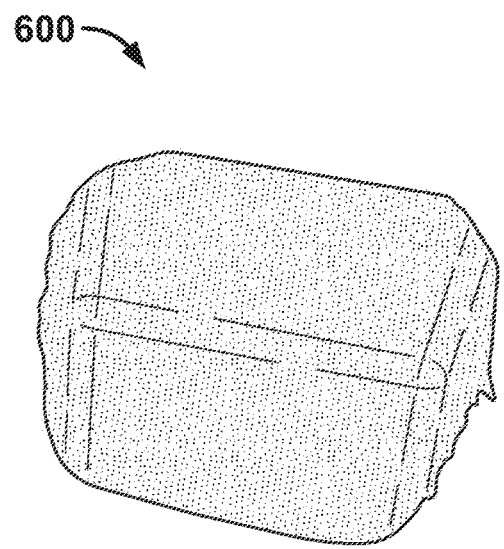
FIG. 6A depicts a perspective view of an embodiment of a fiber-wrapped smokeless tobacco product with a predetermined shape.
Figure 6B:
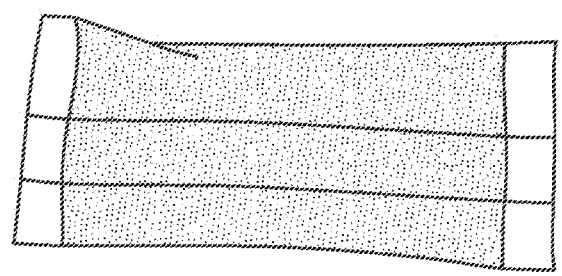
FIG. 6B depicts a conventional pouched tobacco product.

Methods and machines provided herein can, in some cases, enrobe product portions (e.g., smokeless tobacco product portions) in non-woven webs of elastomeric polymer fibers. In some cases, the use of elastomeric polymers, such as polyurethane, in enrobed smokeless tobacco products made using the methods and machines provided herein can provide an adult tobacco consumer with a desirable flavor and tactile experience due to reduced or eliminated seals, improved moldability, controllable flavor release, and/ or an improved visual appearance as compared to a conventional pouched smokeless tobacco product. Accordingly, the use of elastomeric polymer fibers (e.g., polyurethane fibers) as an enrobing material in methods and machines provided herein can produce a smokeless tobacco product having an improved mouth feel as compared to a conventional pouched product, such as shown in FIG. 6B. Elastomeric polymers can also allow an adult tobacco consumer to mold and/or chew an enrobed smokeless tobacco product in their mouth, which can allow for an adult tobacco consumer to both pack and unpack the packing density of the pouch, which can help control a flavor release rate. By unpacking a packing density of a pouch, an adult tobacco consumer can increase a flavor release rate. Additionally, in some cases, elastomeric polymer fibers can be hydrophilic and have good wicking properties, thus an enrobed product portion provided herein can have a moist appearance. Other suitable elastomeric polymers suitable for methods and machines provided herein include styrenes, Suitable elastomeric polymers include EPAMOULD (Epaflex), EPALINE (Epaflex), TEXIN (Bayer), DESMOPAN (Bayer), HYDROPHAN (AdvanceSource Biomaterials), ESTANE (Lubrizol), PELLETHANE (Lubrizol), PEARLTHANE (Merquinsa), IROGRAN (Huntsman), ISOTHANE (Greco), ZYTHANE (Alliance Polymers and Services), VISTAMAX (ExxonMobil), and MD-6717 (Kraton). In some cases, elastomers can be combined with polyolefins at ratios ranging from 1:9 to 9:1. For example, elastomeric polymers can be combined with polypropylene. In some cases, a blend of polyurethane, polypropylene, and styrene can be compounded and used to make polymeric fibers in methods and machines provided herein.

Figure 8:
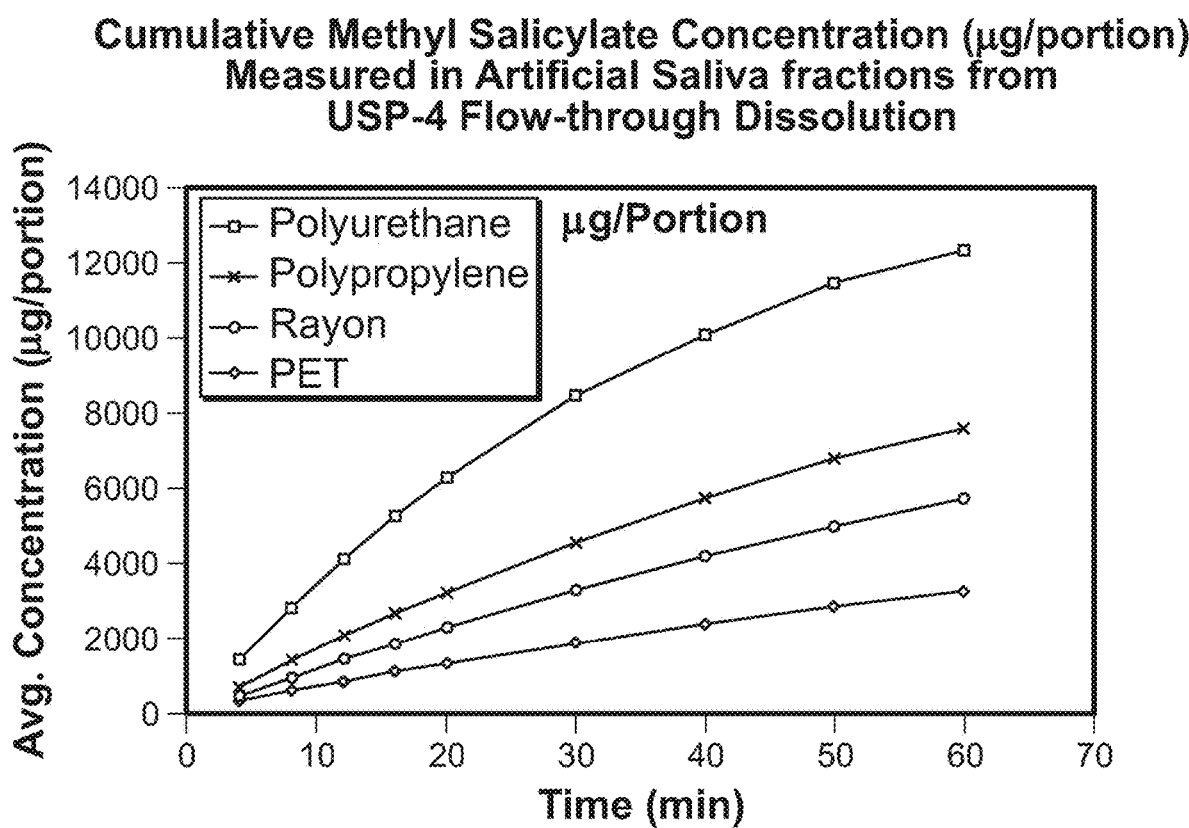
FIG. 8 depicts a chart comparing release rates of methyl sallylate from pouches made of different materials.

Polyurethane polymers can also provide faster and higher cumulative flavor release as compared to non-elastic polymer pouch substrates such as rayon, polypropylene, and polyethylene terephthalate (PET). FIG. 8 depicts the cumulative methyl sallcylate concentration (m/portion) measured in artificial saliva fractions from USP-4 flow-through dissolution pouches made of polyurethane, polypropylene, rayon, and PET. Due to polyurethanes relatively high level of elasticity and natural hydrophilic properties, flavor is able to traverse polyurethane pouching material easier than non-elastomeric nonwoven substrates.

In some cases, non-elastomeric polymers can be used in methods and machines provided herein. Suitable non-elastomeric polymers include rayon, polypropylene, polyethylene, polyethylene terephthalate, and cellulose.

Suitable polymeric materials include one or more of the following polymer materials: acetals, acrylics such as polymethylmethacrylate and polyacrylonitrile, alkyds, polymer alloys, allyls such as diallyl phthalate and diallyl isophthalate, amines such as urea, formaldehyde, and melamine formaldehyde, epoxy, cellulosics such as cellulose acetate, cellulose triacetate, cellulose nitrate, ethyl cellulose, cellulose acetate, propionate, cellulose acetate butyrate, hydroxypropyl cellulose, methyl hydroxypropyl cellulose (CMC), HPMC, carboxymethyl cellulose, cellophane and rayon, chlorinated polyether, coumarone-indene, epoxy, polybutenes, fluorocarbons such as PTFE, FEP, PFA, PCTFE, ECTFE, ETFE, PVDF, and PVF, furan, hydrocarbon resins, nitrile resins, polyaryl ether, polyaryl sulfone, phenol-aralkyl, phenolic, polyamide (nylon), poly (amideimide), polyaryl ether, polycarbonate, polyesters such as aromatic polyesters, thermoplastic polyester, PBT, PTMT, (polyethylene terephthalate) PET and unsaturated polyesters such as SMC and BMC, thermoplastic polyimide, polym-ethyl pentene, polyolefins such as LDPE, LLDPE, HDPE, and UHMWPE, polypropylene, ionomers such as PD and poly allomers, polyphenylene oxide, polyphenylene sulfide, polyurethanes (such as DESMOPAN DP 9370A available from Bayer), poly p-xylylene, silicones such as silicone fluids and elastomers, rigid silicones, styrenes such as PS, ADS, SAN, styrene butadiene latricies, and styrene based polymers, suflones such as polysulfone, polyether sulfone and polyphenyl sulfones, polymeric elastomers, and vinyls such as PVC, ethyl vinyl acetate, polyvinyl acetate, polyvinylidene chloride, polyvinyl alcohol, polyvinyl butyrate, polyvinyl formal, propylene-vinyl chloride copolymer, ethylvinyl acetate, and polyvinyl carbazole, polyvinyl pyrrolidone, and polyethylene oxide, and ethylene vinyl alcohol, sugar alcohols, and starches.

Polymeric fibers used on product portions described herein can have a diameter of less than 100 microns, less than 50 microns, less than 30 microns, less that 10 microns, less than 5 microns, less than 1 microns, less that 0.5 microns, less than 0.1 microns, less than 0.05 microns, or less than 0.01 microns. In some cases, melt-blown polymeric fibers used in methods and machines provided herein can have a diameter of between 0.5 microns and 5 microns. In some case, force-spun polymeric fibers used in methods and machines provided herein can have a diameter of between 10 nanometers and 1 micron. The flow of the polymeric fibers and the dimensions of the polymeric fibers as they exit a melt-blowing or centrifugal force spinning apparatus can result in an intimate contact between the fibers and the smokeless tobacco, such that the polymeric fibers conform to the surface topography of the fibrous tobacco structures.

In some cases, polymer spray heads 110, 210a, 210b, 310a-310d, 410, 510a, and/or 510b can be a melt-blowing device. Melt-blowing is an extrusion process where molten polymeric resins are extruded through an extrusion die (e.g., a spinneret) and gas is introduced to draw the filaments to produce polymeric fibers. The gas can be heated air blown at high velocity through orifices that surround each spinneret or in air slots around each individual spinneret. In some cases, layers of hot air are blown through slots between rows of spinnerets—the strands of polymeric material are attenuated by being trapped between two layers of air. Other methods of delivering the attenuating gas (e.g., heated air) are possible. Suitable melt-blowing devices are described in U.S. Pat. Nos. 4,380,570; 5,476,616; 5,645,790; and 6,013,223 and in U.S. Patent Applications US 2004/0209540; US 2005/0056956; US 2009/0256277; US 2009/0258099; and US 2009/0258562, which are hereby incorporated by reference. In some cases, some spinnerets can also include orifices that provide air flows without polymer to provide additional attenuation and direction of polymer fibers produced from other spinnerets.

In some cases, polymer spray heads 110, 210a, 210b, 310a-310d, 410, 510a, and/or 510b can be a centrifugal force spinning apparatus that uses centrifugal force to create and orient polymeric fibers. In some case, polymer spray heads 110, 210a, 210b, 310a-310d, 410, 510a, and/or 510b can include a spinneret that holds polymeric material and is rotated at high speeds with a motor to produce polymeric fibers. As the spinneret rotates, the polymeric material (in a liquid state) can be pushed to the orifices lining the outer wall of the spinneret. As the polymeric material enters the orifice chamber, molecules disentangle and then align directionally. Centrifugal and hydrostatic forces combine to initiate a liquid material jet. The external aerodynamic environment, combined with the inertial force of continued rotation, further applies shear force and promotes cooling and/or solvent evaporation to further stretch the fiber. The inertia force can stretch molecular chains into the nanoscale and the air turbulence can apply a shear force. In some cases, centrifugal force spun fibers can improve a web strength and random orientation of polymeric fibers deposited onto a product portion due to a long fiber length.

In some cases, polymer spray heads 110, 210a, 210b, 310a-310d, 410, 510a, and/or 510b can be an electro spinning apparatus that spins fibers of diameters ranging from 10 nm to several hundred nanometers. In some cases, electro spun polymers are dissolved in water or organic solvents. An Electro spinning process makes use of electrostatic and mechanical force to spin fibers from the tip of a fine orifice or spinneret. The spinneret is maintained at positive or negative charge by a DC power supply. When the electrostatic repelling force overcomes the surface tension force of the polymer solution, the liquid spills out of the spinneret and forms an extremely fine continuous filament. These filaments are collected onto a rotating or stationary collector with an electrode beneath of the opposite charge to that of the spinneret where they accumulate and bond together to form nanofiber web.

In some cases, polymeric fibers used in methods and machines provided herein are mouth-stable fibers. The mouth-stable fibers can have low extractables, are approved for use with food, and/or be manufactured by suppliers who are GMP approved. Highly desirable are materials that are easy to process and relatively easy to approve for oral use (e.g. quality, low extractables, approved by regulators, suppliers are GMP approved). In some cases, the mouth-stable structural fibers are elastomers. Elastomers can provide webs with improved elongation and toughness. Suitable elastomers include VISTAMAX (ExxonMobil), TEXIN RXT70A (Bayer), and MD-6717 (Kraton). In some cases, elastomers can be combined with polyolefins at ratios ranging from 1:9 to 9:1. For example, elastomers (such as VISTAMAX or MD-6717) can be combined with polypropylene.

Mouth-dissolvable fibers could be made from hydroxypropyl cellulose (HPC), methyl hydroxypropyl cellulose (HPMC), polyvinyl alcohol (PVOH), PVP, polyethylene oxide (PEO), starch and others. Fibers 210 can in some cases include contain flavors, sweeteners, milled tobacco, and other functional ingredients. In some cases, mouth-dissolvable fibers can be combined with mouth-stable fibers to enrobe the product portions as provided herein.

Colorants and/or fillers can also be added to the polymer in polymer spray heads 110, 210a, 210b, 310a-310d, 410, 510a, and/or 510b. The hydraulic permittivity of the enrobing coating of polymeric fibers can also be increased by compounding the polymer with filler prior to forming the polymeric fibers. The hydraulic permittivity is the rate of fluid transfer through a substrate. In some cases, a colorant can be used as the filler. For example, a brown colorant can be added to a feed hopper of an extruder along with a polymer material (e.g., polypropylene or polyurethane) prior to melt-blowing the polymer into the fibers. In addition to improving the hydraulic permittivity, the colorant can improve the aesthetic appeal of the fiber-wrapped product portion. For example, a brown colorant can make a wrapped moist-smokeless tobacco product appear moist.

As discussed above, the polymeric fibers can contact the product portions at a temperature greater than the melt temperature of the polymer. In some cases, however, the polymeric fibers can be quenched and/or treated with a surfactant prior to contacting the product portions. Water vapor can be used to cool the polymeric material. For example, atomized water from a spout can be directed into a stream of molten strands of polymeric material exiting polymer spray heads 110, 210a, 210b, 310a-310d, 410, 510a, and/or 510b to "quench" the polymeric strands and form the fibers. For example, a mist can be aimed towards spinnerets of the melt-blowing spray head. A fine mist of water or surfactant or air can quickly cool the strands below the polymer's melt temperature. In some cases, quenched melt-blown fibers can have improved softness and fiber/web tensile strength.

A surfactant treatment can also be applied to polymeric fibers used in the methods and machines provided herein. In some cases, a surfactant is applied to the polymeric fibers as they exit the spinnerets of polymer spray heads 110, 210a, 210b, 310a-310d, 410, 510a, and/or 510b. In some cases, surfactant can be applied as a mist (either with or without water). In some cases, the surfactant applied as a mist can quench the polymeric fibers. In some cases, the surfactant can be applied in an extrusion process. In some cases, a mixture of water and surfactant can be atomized and applied as mist.

Quenching the polymer can modify the crystallinity of the polymer material to improve tensile strength and mouth feel. The surfactant can improve the hydraulic permittivity of the coating of polymeric fibers (e.g., to improve moisture and flavor release from an enrobed smokeless tobacco product). The hydraulic permittivity is the rate of fluid transfer through a substrate. Sweeteners and/or flavorants can also be atomized and applied to the polymeric fibers as mist to quench the fibers.

The tensile integrity of the wrapped fiber can also be improved by bonding fibers together. In some cases, the wrapped fiber can be heat bonded at intersection points. The heating of the polymeric material to a temperature above its melt temperature can be accomplished by using electrically heated surfaces, ultrasonic bonding, infrared energy, radio frequency energy, microwave energy, laser, and/or needle punching. Stitch bonding, point bonding, and quilting are methods of applying patterns to nonwoven fabrics. These are forms of thermal bonding typically achieved with ultrasonic bonding processes, although other energy sources and related equipment can be used to create particular patterns of bonding within the network of fibers.

The amount of polymeric material used depends on the final use of the enrobed product portion. For an enrobed smokeless tobacco product, the amount can depend on the desired flavor profile and desired mouth feel. In some cases, an enrobed product portion includes less than 200 mg of polymer per product portion. In some cases, a single enrobed product portion can include between 1 and 100 mg of polymeric material, between 60 and 80 mg of polymeric material, between 10 and 50 mg of polymeric material, or between 25 and 75 mg of polymeric material. In some cases, an enrobed product portion includes between 0.1% and 10% by weight of polymeric material, between 0.4% and 5% by weight of polymeric material, between 0.5% and 2% by weight of polymeric material, between 2% and 4% by weight of polymeric material, or between 1% and 3% by weight of polymeric material. In some cases, the basis weight of the wrapping of polymeric fibers on an enrobed product portion can have a basis weight of less than 30 gsm, less than 25 gsm, less than 20 gsm, less than 15 gsm, less than 10 gsm, less than 5 gsm, less than 4 gsm, less than 3 gsm, less than 2 gsm, or less than 1 gsm. In some cases, the wrapping of polymeric fibers on an enrobed product portion can have a basis weight of between 0.5 gsm and 4 gsm, between 1 gsm and 3 gsm, or of about 2 gsm.

Figure 7A:
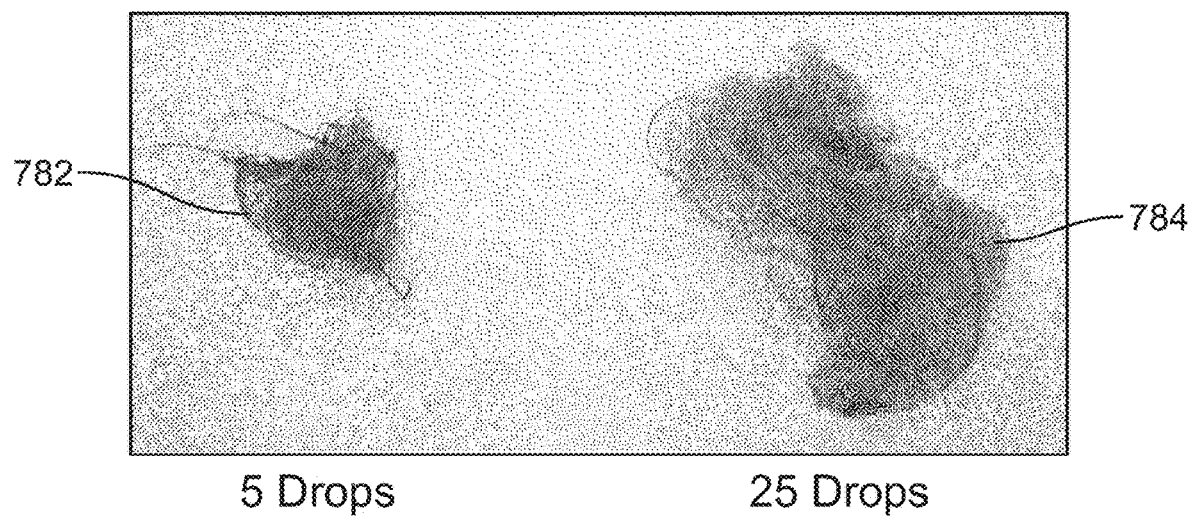
FIGS. 7A and 7B illustrate amounts of polymeric fiber deposited on a product portion using methods and machines provided herein.
Figure 7B:
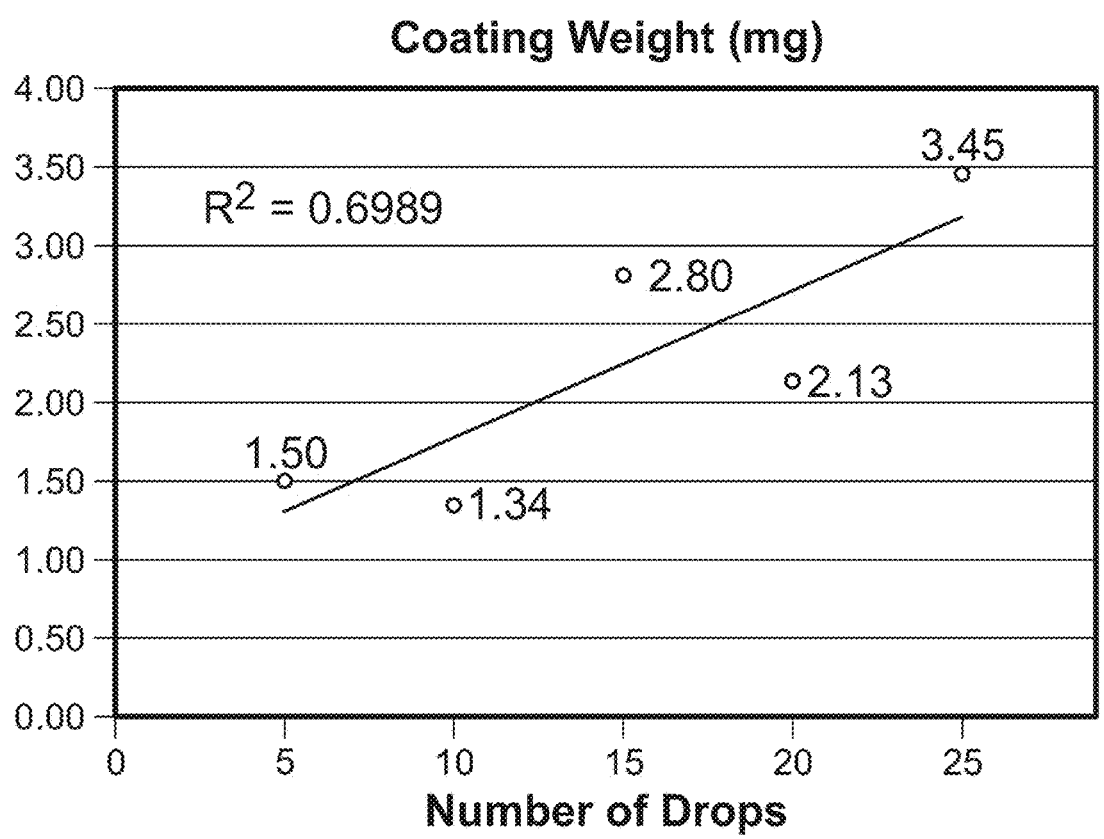

FIGS. 7A and 7B illustrate an amount of polymeric fiber coated onto a product portion based on a number of drops through a polymer enrobing zone. FIG. 7A depicts an amount of polymeric fiber 782, removed from a product portion, deposited on a product portion after 5 drops through a polymer enrobing zone. Polymeric fiber 784 is an amount of polymeric fiber deposited on a product portion after 25 drops through a polymer enrobing zone. FIG. 7B graphically displays the relationship between a number of drops and the coating weigh. In some cases, an enrobed product portion provided herein (e.g., an enrobed smokeless tobacco product) includes between 1.5 mg and 4.0 mg of polymeric fiber.

Enrobed Product Portions

Methods and machines provided herein can be used to enrobe any suitable product portion. Methods and machines provided herein can be useful to coat and contain any fragile body. Exemplary products that can be enrobed in polymeric fibers using a method or machine provided herein include smokeless tobacco products and smokeless tobacco substitutes, herbal and spice products, and teas and other beverage producing mixtures. Polymeric-fiber enrobed smokeless tobacco portions are described below. Smokeless tobacco substitutes can include herbal products that provide a satisfying flavor without tobacco and/or nicotine. For example, in some cases, mixtures of herbs and spices (with or without nicotine) can provide an adult tobacco consumer with a flavor and tactile experience similar to the use of a smokeless tobacco product. In some cases, cellulosic fibers can be mixed with flavors, nicotine, and other additives to provide a flavor and tactile experience similar to the use of a smokeless tobacco product. In some cases, herbal and/or spice mixes can be enrobed in polymeric fibers in a method or machine provided herein to be used in preparing meals and/or beverages. For example, a spice package for a stew can include ingredients such as bay leaf that should be removed from the stew after cooking. In some cases, herbal beverages (e.g., black tea, green tea, etc.) can be enrobed in polymeric fibers using a method and/or machine provided herein to provide an herbal beverage brewing bag (e.g., a tea bag, a coffee pod).

Suitable herbs and other edible plants can be categorized generally as culinary herbs (e.g., thyme, lavender, rosemary, coriander, dill, mint, peppermint) and medicinal herbs (e.g., Dahlias, Cinchona, Foxglove, Meadowsweet, Echinacea, Elderberry, Willow bark). In some cases, the tobacco is replaced with a mixture of non-tobacco plant material. Such non-tobacco compositions may have a number of different primary ingredients, including but not limited to, tea leaves, coffee, red clover, coconut flakes, mint leaves, ginseng, apple, corn silk, grape leaf, and basil leaf. The plant material typically has a total oven volatiles content of about 10% by weight or greater; e.g., about 20% by weight or greater; about 40% by weight or greater; about 15% by weight to about 25% by weight; about 20% by weight to about 30% by weight; about 30% by weight to about 50% by weight; about 45% by weight to about 65% by weight; or about 50% by weight to about 60% by weight.

Polymeric Fiber Enrobed Smokeless Tobacco Product Portion

A fiber-wrapped smokeless tobacco portion can retain the smokeless tobacco fibers when placed in an adult tobacco consumer's mouth, yet allow the flavors and substances of the tobacco to pass through the polymeric fibers. FIG. 6A depicts an exemplary polymeric fiber enrobed smokeless tobacco portion 600. In some cases, polymeric fibers on polymeric fiber enrobed smokeless tobacco portion 600 have a diameter of less than 100 microns. Polymeric fibers wrapped around the smokeless tobacco can form a moisture-permeable porous surface that can provide a unique tactile and flavor experience to an adult tobacco consumer. In particular, polymeric fibers can provide a smooth mouth texture, bind/encase/encapsulate the smokeless tobacco during use, but give the adult tobacco consumer good access to the smokeless tobacco and any flavor contained therein. As compared to a typical pouch paper, the polymeric fibers can be softer, be free of seams, have a lower basis weight, act as less of a selective membrane, be chewable, and have greater moldability/manageability. The methods and machines provided herein can be used to produce a polymeric fiber enrobed smokeless tobacco portion 600 that remains cohesive and are less likely to break apart during packaging, handling, shipping, and during use by adult tobacco consumers. In some cases, polymeric fibers can provide a soft and highly porous coating around the smokeless tobacco. Methods and machines provided herein can enrobe and/or wrap smokeless tobaccos that are not suitable for being pouched using a typical pouching operation; for example, smokeless tobaccos having an average partial aspect ratio of greater than 3 (e.g., long-cut smokeless tobacco) and/or high moisture tobacco (e.g., a tobacco having an OV content of greater than 47 weight percent).

The described combinations of the polymeric material and smokeless tobacco can provide a softer mouth feel. Moreover, in some cases, the polymeric material can be elastic or pliable (e.g., a polymeric polyurethane such as DESMOPAN DP 9370A available from Bayer), thus forming a smokeless tobacco product that can tolerate being "worked" (e.g., chewed or squeezed) in the mouth without the tobacco dispersing within the mouth. For example, the smokeless tobacco product can be worked to provide flavor and/or to comfortably conform between the cheek and gum. In some cases, combinations of mouth-stable and mouth-dissolvable polymeric materials are combined with a body including smokeless tobacco material to provide a product that becomes looser after being placed in an adult tobacco consumer's mouth, yet remains generally cohesive. Polymeric structural fibers can also be a composite of multiple materials, which may include both mouth-stable and mouth-dissolvable materials.

Polymeric fiber enrobed smokeless tobacco portion 600 can include polymeric structural fibers formed of polymeric fibers deposited using a method or machine provided herein that forms a nonwoven network against and around a body of smokeless tobacco material. As used herein, the term "nonwoven" means a material made from fibers that are connected by entanglement and/or bonded together by a chemical, heat, or solvent treatment where the material does not exhibit the regular patterns of a woven or knitted fabric. Polymeric fiber enrobed smokeless tobacco portions 600 can also be dimensionally stable. As used herein, "dimensionally stable" means that the fiber-wrapped smokeless tobacco product retains its shape under its own weight. In some cases, polymeric fiber enrobed smokeless tobacco portions 600 are flexible, yet can be picked up at one end without the force of gravity causing the polymeric fiber enrobed smokeless tobacco portions 600 to bend or sag. In some cases, polymeric fiber enrobed smokeless tobacco portions 600 can be easily deformable.

Individual product portions of smokeless tobacco for use in a method or machine provided herein can be made using any suitable method. For example, smokeless tobacco can be added to a mixer and mixed with optional binder(s), and optional flavorants, and/or other additives. For example, the smokeless tobacco can be long cut tobacco, having an oven volatiles content of 10-61 weight percent. In some cases, an added binder can be TICALOID LITE Powder. In some cases, an added flavorants and/or other additives can include, for example, a mint flavoring, a sweetener, and a pH modifier. The mixing can occur in any commercially available countertop mixer or industrial mixer, for example a HOBART 40 lbs mixer or a FORBERG 250 lbs Paddle Mixer. Water can be added to the tobacco prior to or during the mixing process to alter the total oven volatiles content. The oven volatiles content can also be modified by heating the mixture. In some cases, a commercially available smokeless tobacco product (e.g., SKOAL Long Cut) can be mixed with a binder (e.g., TICALOID LITE Powder) to form the mixture, which can then be shaped into one or more bodies used as product portions in methods and machines provided herein.

In some cases, bodies of smokeless tobacco used as product portions in methods and machines provided herein can have less than 1% by weight of binder, less than 0.5% by weight of binder, less than 0.3% by weight of binder, less than 0.2% by weight of binder, less than 0.1% by weight of binder, or less than 0.05% by weight of binder. In some cases, bodies of smokeless tobacco used as product portions in methods and machines provided herein include one or more binders, such as a hydrocolloid, in an amount of between 0.05 weight percent and 0.8 weight percent. In some cases, bodies of smokeless tobacco used as product portions in methods and machines provided herein include between 0.1 and 0.5 weight percent binder. For example, bodies of smokeless tobacco used as product portions in methods and machines provided herein can include between 0.2 and 0.4 weight percent of a binder that includes guar gum, xanthan gum, cellulose gum, or similar materials or a combination thereof.

The molding of a product portion out of smokeless tobacco can include depositing a smokeless tobacco containing mixture into a mold. In some cases, a smokeless tobacco containing mixture is deposited into an open mold plate including a plurality of identically shaped cavities. A molding process can include applying pressure to a smokeless tobacco containing mixture. This pressure can be applied as injection pressure applied to the mixture as it is forced into a closed cavity or by compressing each cavity filled with the mixture. The pressure used during the molding process impacts that amount of compression experienced by the mixture and thus the material properties of the mixture. In some cases, 50-300 lbs. of injection pressure is used to deliver a smokeless tobacco containing mixture into a plurality of mold cavities. The molds can be filled with continuous or intermittent pressure. A screw pump can be used to apply the pressure to a smokeless tobacco containing mixture. For example, a FORMAX® machine (e.g., the FORMAX F-6 and F-19 units) can be used to inject a smokeless tobacco containing mixture into cavities in a mold plate. For example, such a process is described in U.S. Patent Application Publication No. 2012/0024301, which is hereby incorporated by reference. In some cases, the mold cavities have a volume sized to create shaped smokeless tobacco bodies having a mass of, for example, about 2.35 grams. The edges and corners of the mold can be rounded to permit the shaped smokeless tobacco bodies to be easily released from the mold and be comfortable in the mouth of an adult tobacco consumer. In some cases, a molding step can include extruding smokeless tobacco material (optionally with binders, flavorants, and other additives), and cutting the extruded smokeless tobacco material to form product portions.

The polymer used in polymeric fiber enrobed smokeless tobacco portion 600 can be any of the polymers discussed above. In some cases, polymeric fiber enrobed smokeless tobacco portion 600 is polyurethane and/or polypropylene. Binders suitable for use in the polymeric fiber enrobed smokeless tobacco portion 600 provided herein include orally compatible polymers, such as cellulosics (e.g., carboxymethyl cellulose (CMC), hydroxypropyl cellulose (HPC), hydroxyethyl cellulose (HEC), hydroxypropyl methyl cellulose (HPMC), and methyl cellulose (MC)); natural polymers (e.g., starches and modified starches, konjac, collagen, inulin, soy protein, whey protein, casein, and wheat gluten); seaweed-derived polymers (e.g., carrageenan (kappa, iota, and lambda); alginates, (and propylene glycol alginate), microbial-derived polymers (e.g., xanthan, dextrin, pullulan, curdlan, and gellan); extracts (e.g., locust bean gum, guar gum, tara gum, gum tragacanth, pectin (lo methoxy and amidated), agar, zein, karaya, gelatin, psyllium seed, chitin, and chitosan), exudates (e.g., gum acacia (arabic) and shellac), synthetic polymers (e.g., polyvinyl pyrrolidone, polyethylene oxide, and polyvinyl alcohol. Flavors and other additives can be included in polymeric fiber enrobed smokeless tobacco portion 600 described herein and can be added to polymeric fiber enrobed smokeless tobacco portion 600 at any point in the process of making the polymeric fiber enrobed smokeless tobacco portion 600. Suitable flavorants include wintergreen (i.e., methyl salicylate), cherry and berry type flavorants, various liqueurs and liquors such as Dramboui, bourbon, scotch, whiskey, spearmint, peppermint, lavender, cinnamon, cardamon, apium graveolents, clove, cascarilla, nutmeg, sandalwood, bergamot, geranium, honey essence, rose oil, vanilla, lemon oil, orange oil, Japanese mint, cassia, caraway, cognac, jasmin, chamomile, menthol, ilangilang, sage, fennel, piment, ginger, anise, coriander, coffee, liquorish, and mint oils from a species of the genus *Mentha*. Mint oils useful in some cases of the fiber-wrapped smokeless tobacco products include spearmint and peppermint. Flavorants can also be included in the form of flavor beads (e.g., flavor capsules, flavored starch beads, flavored gelatin beads), which can be dispersed within the fiber-wrapped smokeless tobacco product (e.g., in a nonwoven network of polymeric structural fibers). For example, the fiber-wrapped smokeless tobacco product could include the beads described in U.S. Patent Application Publication 2010/0170522, which is hereby incorporated by reference. Other optional additives included as fillers (e.g., starch, di-calcium phosphate, lactose, beet fiber (FIBREX), sorbitol, mannitol, and microcrystalline cellulose), soluble fiber (e.g., FIBERSOL from Matsushita), calcium carbonate, dicalcium phosphate, calcium sulfate, and clays), lubricants (e.g., lecithin, stearic acid, hydrogenated vegetable oil, canola oil, mineral oil, polyethylene glycol 4000-6000 (PEG), sodium lauryl sulfate (SLS), glyceryl palmitostearate, sodium benzoate, sodium stearyl fumarate, talc, and stearates (e.g., Mg or K), and waxes (e.g., glycerol monostearate, propylene glycol monostearate, and acetylated monoglycerides), plasticizers (e.g., glycerine), propylene glycol, polyethylene glycol, sorbitol, mannitol, triacetin, and 1,3 butane diol), stabilizers (e.g., ascorbic acid and monosterol citrate, BHT, or BHA), artificial sweeteners (e.g., sucralose, saccharin, and aspartame), disintegrating agents (e.g., starch, sodium starch glycolate, cross caramellose, cross linked PVP), pH stabilizers, salt, or other compounds (e.g., vegetable oils, surfactants, and preservatives). Some compounds display functional attributes that fall into more than one of these categories. For example, propylene glycol can act as both a plasticizer and a lubricant, and sorbitol can act as both a filler and a plasticizer.

Smokeless tobacco is tobacco suitable for use in an orally used tobacco product. By "smokeless tobacco" it is meant a part, e.g., leaves, and stems, of a member of the genus *Nicotiana* that has been processed. Exemplary species of tobacco include *N. rustica, N. tabacum, N. tomentosiformis*, and *N. sylvestris*. Suitable tobaccos include fermented and unfermented tobaccos. In addition to fermentation, the tobacco can also be processed using other techniques. For example, tobacco can be processed by heat treatment (e.g., cooking, steam treating, toasting), flavoring, enzyme treatment, expansion, and/or curing. Both fermented and non-fermented tobaccos can be processed using these techniques.

Tobacco can be conditioned by heating, sweating and/or pasteurizing steps as described in U.S. Publication Nos. 2004/0118422 or 2005/0178398. In some cases, the tobacco can be unprocessed tobacco. Specific examples of suitable processed tobaccos include, dark air-cured, dark fire-cured, burley, flue cured, and cigar filler or wrapper, as well as the products from the whole leaf stemming operation. In some cases, smokeless tobacco includes up to 70% dark tobacco on a fresh weight basis. Fermenting typically is characterized by high initial moisture content, heat generation, and a 10 to 20% loss of dry weight. See, e.g., U.S. Pat. Nos. 4,528,993; 4,660,577; 4,848,373; and 5,372,149. In addition to modifying the aroma of the leaf, fermentation can change the color, texture, taste, and sensorial attributes of a leaf. Also during the fermentation process, evolution gases can be produced, oxygen can be taken up, the pH can change, and the amount of water retained can change. See, for example, U.S. Publication No. 2005/0178398 and Tso (1999, Chapter 1 in Tobacco, Production, Chemistry and Technology, Davis & Nielsen, eds., Blackwell Publishing, Oxford). Cured, or cured and fermented tobacco, can be further processed (e.g., cut, expanded, blended, milled or comminuted) prior to incorporation into the smokeless tobacco product. The tobacco, in some cases, is long cut fermented cured moist tobacco having an oven volatiles content of between 10 and 61 weight percent prior to mixing with the polymeric material and optionally flavorants and other additives.

The tobacco can, in some cases, be prepared from plants having less than 20 μg of DVT per $cm^2$ of green leaf tissue. For example, the tobacco particles can be selected from the tobaccos described in U.S. Patent Publication No. 2008/0209586, which is hereby incorporated by reference. Tobacco compositions containing tobacco from such low-DVT varieties exhibits improved flavor characteristics in sensory panel evaluations when compared to tobacco or tobacco compositions that do not have reduced levels of DVTs.

Green leaf tobacco can be cured using conventional means, e.g., flue-cured, barn-cured, fire-cured, air-cured, or sun-cured. See, for example, Tso (1999, Chapter 1 in Tobacco, Production, Chemistry and Technology, Davis & Nielsen, eds., Blackwell Publishing, Oxford) for a description of different types of curing methods. Cured tobacco is usually aged in a wooden drum (i.e., a hogshead) or cardboard cartons in compressed conditions for several years (e.g., two to five years), at a moisture content ranging from 10% to about 25%. See, U.S. Pat. Nos. 4,516,590 and 5,372,149. Cured and aged tobacco then can be further processed. Further processing includes conditioning the tobacco under vacuum with or without the introduction of steam at various temperatures, pasteurization, and fermentation. Fermentation is typically characterized by high initial moisture content, heat generation, and a 10% to 20% loss of dry weight. See, e.g., U.S. Pat. Nos. 4,528,993, 4,660,577, 4,848,373, 5,372,149; U.S. Publication No. 2005/0178398; and Tso (1999, Chapter 1 in Tobacco, Production, Chemistry and Technology, Davis & Nielsen, eds., Blackwell Publishing, Oxford). Cure, aged, and fermented smokeless tobacco can be further processed (e.g., cut, shredded, expanded, or blended). See, for example, U.S. Pat. Nos. 4,528,993; 4,660, 577; and 4,987,907.

The smokeless tobacco can be processed to a desired size. For example, long cut smokeless tobacco typically is cut or shredded into widths of about 10 cuts/inch up to about 110 cuts/inch and lengths of about 0.1 inches up to about 1 inch. Double cut smokeless tobacco can have a range of particle sizes such that about 70% of the double cut smokeless tobacco falls between the mesh sizes of −20 mesh and 80 mesh. Other lengths and size distributions are also contemplated.

The smokeless tobacco can have a total oven volatiles content of about 10% by weight or greater; about 20% by weight or greater; about 40% by weight or greater; about 15% by weight to about 25% by weight; about 20% by weight to about 30% by weight; about 30% by weight to about 50% by weight; about 45% by weight to about 65% by weight; or about 50% by weight to about 60% by weight. Those of skill in the art will appreciate that "moist" smokeless tobacco typically refers to tobacco that has an oven volatiles content of between about 40% by weight and about 60% by weight (e.g., about 45% by weight to about 55% by weight, or about 50% by weight). As used herein, "oven volatiles" are determined by calculating the percentage of weight loss for a sample after drying the sample in a pre-warmed forced draft oven at 110 degrees C. for 3.25 hours. The fiber-wrapped smokeless tobacco product can have a different overall oven volatiles content than the oven volatiles content of the smokeless tobacco used to make the fiber-wrapped smokeless tobacco product. The processing steps described herein can reduce or increase the oven volatiles content. The overall oven volatiles content of the fiber-wrapped smokeless tobacco product is discussed below.

Polymeric fiber enrobed smokeless tobacco portion 600 can include between 15 weight percent and 85 weight percent smokeless tobacco on a dry weight basis. The amount of smokeless tobacco in polymeric fiber enrobed smokeless tobacco portion 600 on a dry weight basis is calculated after drying polymeric fiber enrobed smokeless tobacco portion 600 in a pre-warmed forced draft oven at 110 degrees C. for 3.25 hours. The remaining non-volatile material is then separated into tobacco material and polymeric material. The percent smokeless tobacco in the fiber-wrapped smokeless tobacco product is calculated as the weight smokeless tobacco divided by the total weight of the non-volatile materials. In some cases, the fiber-wrapped smokeless tobacco product includes between 20 and 60 weight percent tobacco on a dry weight basis. In some cases, polymeric fiber enrobed smokeless tobacco portion 600 includes at least 28 weight percent tobacco on a dry weight basis. For example, polymeric fiber enrobed smokeless tobacco portion 600 can include a total oven volatiles content of about 57 weight percent, about 3 weight percent polymeric material, and about 40 weight percent smokeless tobacco on a dry weight basis.

Polymeric fiber enrobed smokeless tobacco portion 600 can have a total oven volatiles content of between 10 and 61 weight percent. In some cases, the total oven volatiles content is at least 40 weight percent. The oven volatiles include water and other volatile compounds, which can be a part of the tobacco, the polymeric material, the flavorants, and/or other additives. As used herein, the "oven volatiles" are determined by calculating the percentage of weight loss for a sample after drying the sample in a pre-warmed forced draft oven at 110 degrees C. for 3.25 hours. Some of the processes may reduce the oven volatiles content (e.g., heating the composite or contacting the smokeless tobacco with a heated polymeric material), but the processes can be controlled to have an overall oven volatiles content in a desired range. For example, water and/or other volatiles can be added back to the fiber-wrapped smokeless tobacco product to bring the oven volatiles content into a desired range. In some cases, the oven volatiles content of polymeric fiber enrobed smokeless tobacco portion 600 is between 4 and 61 weight percent. In some cases, the oven volatiles content of polymeric fiber enrobed smokeless tobacco portion 600 is between 47 and 61 weight percent. For example, the oven volatiles content of smokeless tobacco used in the various processed described herein can be about 57 weight percent. In some cases, the oven volatiles content can be between 10 and 30 weight percent. In some cases, enrobed product portions produced in methods and/or machines provided herein can be rewet with water and/or a solution of flavorants, sweeteners, and/or other additives discussed herein to wick the coating of polymeric fibers, provide a moist appearance, prove a flavor immediately, and/or to increase a flavor intensity.

Some embodiments of a smokeless tobacco system can include one or more polymeric fiber enrobed smokeless tobacco portion 600. A plurality of polymeric fiber enrobed smokeless tobacco portions 500 can be arranged in an interior space of a bottom container that mates with a lid. The plurality of the polymeric fiber enrobed smokeless tobacco portions 500 arranged in the container can all have a substantially similar shape so that an adult tobacco consumer can conveniently select any of the similarly shaped polymeric fiber enrobed smokeless tobacco portions 500 therein and receive a generally consistent portion of the smokeless tobacco.

An exemplary shape of a polymeric fiber enrobed smokeless tobacco portion 600 provided herein is shown in FIG. 6A, which depicts a perspective view of polymeric fiber enrobed smokeless tobacco portion 600 having a substantially rectangular cuboidal shape with rounded corners in the longitudinal (lengthwise) plane. In some cases, polymeric fiber enrobed smokeless tobacco portion 600 has a substantially rectangular cuboidal shape having a length of between 15 mm and 50 mm, a width of between 5 mm and 20 mm, and a thickness of between 3 mm and 12 mm. For example, a substantially rectangular cuboidal shape could have a length of between 26 mm and 30 mm, a width of between 10 mm and 12 mm, and a thickness of between 6 mm and 8 mm. A product having a length of 28 mm, a width of 11 mm, and thickness of 7 mm could have a product weight of about 2.35 g. In other embodiments, a substantially rectangular cuboidal shape could have a length of between 18 and 21 mm, a width of between 10 mm and 12 mm, and a thickness of between 9 mm and 11 mm. In some cases, the preformed smokeless tobacco product can be cube shaped. Other shapes and sizes are also contemplated. For example, polymeric fiber enrobed smokeless tobacco portion 600 can be configured to be: (A) an elliptical shaped fiber-wrapped smokeless tobacco product; (B) an elongated elliptical shaped fiber-wrapped smokeless tobacco product; (C) a semi-circular fiber-wrapped smokeless tobacco product; (D) a square- or rectangular-shaped fiber-wrapped smokeless tobacco product; (E) a football-shaped fiber-wrapped smokeless tobacco product; (F) an elongated rectangular-shaped fiber-wrapped smokeless tobacco product; (G) boomerang-shaped fiber-wrapped smokeless tobacco product; (H) a rounded-edge rectangular-shaped fiber-wrapped smokeless tobacco product; (I) teardrop- or comma-shaped fiber-wrapped smokeless tobacco product; (J) bowtie-shaped fiber-wrapped smokeless tobacco product; and (K) peanut-shaped fiber-wrapped smokeless tobacco product. Polymeric fiber enrobed smokeless tobacco portion 600 can have different thicknesses or dimensionality, such that a beveled fiber-wrapped smokeless tobacco product (e.g., a wedge) is produced or a hemi-spherical shape is produced.

Other Embodiments

It is to be understood that, while the invention has been described herein in conjunction with a number of different aspects, the foregoing description of the various aspects is intended to illustrate and not limit the scope of the invention, which is defined by the scope of the appended claims. Other aspects, advantages, and modifications are within the scope of the following claims.

Disclosed are methods and compositions that can be used for, can be used in conjunction with, can be used in preparation for, or are products of the disclosed methods and compositions. These and other materials are disclosed herein, and it is understood that combinations, subsets, interactions, groups, etc. of these methods and compositions are disclosed. That is, while specific reference to each various individual and collective combinations and permutations of these compositions and methods may not be explicitly disclosed, each is specifically contemplated and described herein. For example, if a particular composition of matter or a particular method is disclosed and discussed and a number of compositions or methods are discussed, each and every combination and permutation of the compositions and the methods are specifically contemplated unless specifically indicated to the contrary. Likewise, any subset or combination of these is also specifically contemplated and disclosed

What is claimed is:

1. An oral product comprising:
   tobacco; and
   a fiber wrap surrounding the tobacco, the fiber wrap being seamless and comprising a plurality of melt-blown fibers, the melt-blown fibers including,
   a polymer, and
   a colorant configured to increase a hydraulic permittivity of the fiber wrap.

2. The oral product of claim 1, wherein the tobacco includes fibers having an average particle aspect ratio of greater than 3.

3. The oral product of claim 1, wherein the tobacco has a total oven volatiles content ranging from 45% by weight to 65% by weight.

4. The oral product of claim 1, wherein the polymer includes an elastomer.

5. The oral product of claim 4, wherein the elastomer includes polyurethane.

6. The oral product of claim 1, wherein at least a portion of the fibers of the plurality of melt-blown fibers have a diameter of less than 100 microns.

7. The oral product of claim 6, wherein the diameter ranges from 0.5 microns to 5 microns.

8. The oral product of claim 7, wherein the diameter is less than 1 micron.

9. The oral product of claim 1, wherein the polymer is hydrophilic.

10. The oral product of claim 1, wherein the polymer is mouth-stable.

11. The oral product of claim 1, wherein the fiber wrap further includes a filler, the filler being configured to increase the hydraulic permittivity of the fiber wrap.

12. The oral product of claim 1, wherein the colorant includes a brown colorant.

13. The oral product of claim 1, wherein the polymer is present in the oral product in an amount less than or equal to 200 mg.

14. An oral product comprising:
   non-tobacco cellulosic fibers; and
   a fiber wrap surrounding the non-tobacco cellulosic fibers, the fiber wrap being seamless and comprising a plurality of melt-blown fibers, the melt-blown fibers including,
      a polymer, and
      a colorant configured to increase a hydraulic permittivity of the fiber wrap.

15. The oral product of claim 14, wherein the non-tobacco cellulosic fibers have an average particle aspect ratio of greater than 3.

16. The oral product of claim 14, wherein the non-tobacco cellulosic fibers have a total oven volatiles content ranging from 45% by weight to 65% by weight.

17. The oral product of claim 14, wherein the polymer includes an elastomer.

18. The oral product of claim 17, wherein the elastomer includes polyurethane.

19. The oral product of claim 14, wherein at least a portion of the fibers of the plurality of melt-blown fibers have a diameter of less than 100 microns.

20. The oral product of claim 14, wherein the non-tobacco cellulosic fibers have a total oven volatiles content ranging from 10% by weight to 20% by weight.

21. The oral product of claim 14, wherein the non-tobacco cellulosic fibers have a total oven volatiles content ranging from 25% by weight to 35% by weight.

22. The oral product of claim 14, further comprising:
   nicotine.

* * * * *